(12) United States Patent
Dann et al.

(10) Patent No.: US 11,921,786 B2
(45) Date of Patent: Mar. 5, 2024

(54) SCALABLE BANDWIDTH EFFICIENT GRAPH PROCESSING ON FIELD PROGRAMMABLE GATE ARRAYS

(71) Applicant: SAP SE, Walldorf (DE)

(72) Inventors: Jonas Dann, Heidelberg (DE); Daniel Ritter, Heidelberg (DE)

(73) Assignee: SAP SE, Walldorf (DE)

(*) Notice: Subject to any disclaimer, the term of this patent is extended or adjusted under 35 U.S.C. 154(b) by 51 days.

(21) Appl. No.: 17/747,922

(22) Filed: May 18, 2022

(65) Prior Publication Data

US 2023/0376534 A1    Nov. 23, 2023

(51) Int. Cl.
*G06F 17/00* (2019.01)
*G06F 16/901* (2019.01)

(52) U.S. Cl.
CPC ............... *G06F 16/9024* (2019.01)

(58) Field of Classification Search
CPC .................................................. G06F 16/9024
See application file for complete search history.

(56) References Cited

U.S. PATENT DOCUMENTS

| | | | | |
|---|---|---|---|---|
| 11,080,334 | B1* | 8/2021 | Esch | G06F 16/9024 |
| 11,288,221 | B2* | 3/2022 | Liao | G06F 9/5044 |
| 2020/0117689 | A1* | 4/2020 | Sevenich | G06F 16/23 |
| 2020/0226473 | A1* | 7/2020 | Sharma | G06N 3/04 |

OTHER PUBLICATIONS

Ahn, J. et al., "A scalable processing-in-memory accelerator for parallel graph processing," in ISCA. ACM, 2015, pp. 105-117.
Attia, O.G., et al., "Cygraph: A reconfigurable architecture for parallel breadth-first search," in IPDPS, 2014, pp. 228-235.
Ayupov, A. et al., "A template-based design methodology for graph-parallel hardware accelerators," IEEE Trans. on CAD of Integrated Circuits and Systems, vol. 37, No. 2, pp. 420-430, 2018.
Balaji, V. et al., "When is graph reordering an optimization? studying the effect of lightweight graph reordering across applications and input graphs," in IISWC. IEEE Computer Society, 2018, pp. 203-214.

(Continued)

*Primary Examiner* — Greta L Robinson
(74) *Attorney, Agent, or Firm* — Mintz Levin Cohn Ferris Glovsky and Popeo, P.C.

(57) ABSTRACT

A method for graph processing in a scalable graph processing framework may include applying a two-dimensional partitioning scheme to partition a graph. One or more partitions of the graph may be distributed to each graph core such that each graph core executes a graph processing algorithm on one or more partitions of the graph. The executing of the graph processing algorithm may include the graph cores exchanging vertex labels via a crossbar interconnecting the plurality of graph cores. Each graph core in the scalable graph processing framework may be coupled with a single memory channel upon which the partitions of the graph are distributed.
The graph cores may synthesized on a field programmable gate array (FPGA) based on one or more user defined functions (UDFs). Related systems and computer program products are also provided.

20 Claims, 15 Drawing Sheets

(56) References Cited

OTHER PUBLICATIONS

Besta, M. et al., "Demystifying graph databases: Analysis and taxonomy of data organization, system designs, and graph queries," arXiv:1910.09017, Oct. 20, 2019.

Betkaoui, B. et al., "A reconfigurable computing approach for efficient and scalable parallel graph ration," in ASAP, 2012, pp. 8-15.

Chen, X. et al., "Thundergp: Hls-based graph processing framework on FPGAS," in FPGA, 2021, pp. 69-80.

Dai, G. et al., "ForeGraph: Exploring large-scale graph processing on multi-FPGA architecture," in FPGA, 2017, pp. 217-226.

Dann, J. et al., "Demystifying memory access patterns of FPGA-based graph processing accelerators," in GRADES-NDA. ACM, 2021, pp. 3:1-3:10.

Dann, J. et al., "Exploring memory access patterns for graph processing accelerators," in BTW, 2021, pp. 101-122.

Dann, J. et al., "Non-relational databases on FPGAs: Survey, design decisions, challenges," arXiv:2007.07595, Jul. 15, 2020.

Lei, G. et al., "TorusBFS: a novel message-passing parallel breadth-first search architecture on FPGAs," in IRACST-ESTIJ, vol. 5, 2015.

Leskovec, J. et al., "SNAP Datasets: Stanford large network dataset collection," http://snap.stanford.edu/data, Jun. 2014.

Liu, C. et al., "ScalaBFS: A scalable BFS accelerator on FPGA-HBM platform," in FPGA. ACM, 2021, p. 147.

Lumsdaine, A. et al., "Challenges in parallel graph processing," Parallel Processing Letters, vol. 17, No. 01, pp. 5-20, 2007.

Rossi, R.A. et al., "The network data repository with interactive graph analytics and visualization," in AAAI.

Shao, Z. et al., "Improving performance of graph processing on FPGA-DRAM platform by two- level vertex caching," in FPGA, 2019.

Yao, P. et al., "An efficient graph accelerator with parallel data conflict management," in PACT, 2018, pp. 8:1-8:12.

Zhang, J. et al., "Degree-aware hybrid graph traversal on FPGA-HMC platform," in FPGA, 2018, pp. 229-238.

Zhou, S. et al., "HitGraph: high-throughput graph processing framework on FPGA," IEEE Trans. Parallel Distrib. Syst., vol. 30, No. 10, pp. 2249-2264, 2019.

Zhou, S. et al., "Optimizing memory performance for FPGA implementation of PageRank," in, ReConfig, 2015, pp. 1-6.

Zhu, X. et al., "Gridgraph: Large-scale graph processing on a single machine using 2-level hierarchical partitioning," in USENIX ATC, 2015, pp. 375-386.

* cited by examiner

SCALABLE BANDWIDTH EFFICIENT GRAPH PROCESSING ON FIELD PROGRAMMABLE GATE ARRAYS

TECHNICAL FIELD

The subject matter described herein relates generally to database processing and more specifically to hardware acceleration for graph processing.

BACKGROUND

A database may be configured to store data in accordance with a database schema. For example, in a graph database, data may be represented and stored using graph structures including, for example, vertices, directed edges, undirected edges, and/or the like. Notably, the graph database may store the relationships between different data items explicitly. For instance, the vertices of a graph may correspond to the individual data items stored in the graph database while the edges of the graph may define the relationships between these data items. Attributes associated with the vertices and/or the edges may provide additional properties for the data items stored in the graph database and/or the relationships that exist between different data items. Contrastingly, a relational database may store the relationships between different data items implicitly, for example, by organizing the data items into one or more database tables. A relational database may be configured to store graph data, for example, by storing the vertices of a graph in a vertex table and the edges of the graph in a separate edge table.

SUMMARY

Systems, methods, and articles of manufacture, including computer program products, are provided for hardware accelerated graph processing. In some example embodiments, there is provided a system that includes at least one processor and at least one memory. The at least one memory may include program code that provides operations when executed by the at least one processor. The operations may include: partitioning a graph into a plurality of partitions; distributing, to each graph core of a plurality of graph cores, one or more partitions of the plurality of partitions such that each graph core executes a graph processing algorithm on one or more partitions of the plurality of partitions, the executing of the graph processing algorithm including the plurality of graph cores exchanging one or more vertex labels via a crossbar interconnecting the plurality of graph cores; and determining, based at least on a plurality of partial results received from the plurality of graph cores, a result of the graph processing algorithm.

In some variations, one or more features disclosed herein including the following features can optionally be included in any feasible combination. The partitioning of the graph may include partitioning, into a plurality of intervals, a plurality of vertices of the graph. The partitioning of the graph may further include partitioning each interval of the plurality of intervals, a plurality of sub-intervals.

In some variations, a size of each sub-interval of the plurality of sub-intervals may correspond to a size of a label scratch pad of each graph core. The label scratch pad may be an on-chip memory serving non-sequential read requests that occur during each iteration of the graph processing algorithm.

In some variations, the on-chip memory may be a block dynamic access memory (BRAM).

In some variations, each graph core processes the one or more partitions by at least reading a partition specific interval of a vertex label array into the label scratch pad, reading vertex labels and pointers sequentially, reading a neighbors array of a current partition sequentially, placing a plurality of neighbor vertex identifiers in parallel through the crossbar to pass the plurality of neighbor vertex identifiers to a correct graph core, and retrieving, from the crossbar, a plurality of resulting neighbor vertex labels in an original order.

In some variations, each graph core may further process the one or more partitions by at least combining a plurality of source vertices and destination vertices based at least on a left bound and a right bound of a source vertex and a neighbor index of a destination vertex.

In some variations, each graph core may further process the one or more partitions by at least updating, based at least on a plurality of edges annotated with a source vertex label and a destination vertex label, a portion of the plurality of vertices comprising a partition.

In some variations, each graph core of the plurality of graph cores may be coupled with a single memory channel upon which the plurality of partitions are distributed to the plurality of graph cores.

In some variations, the crossbar may include a bank shuffle level configured to receive route, from one graph core to another graph core, a neighbors array comprising a sequence of numbers serving as addresses to vertex labels in a vertex labels array of a corresponding partition.

In some variations, the routing is may be performed based on a last $\log_2 e$ quantity of bits comprising the neighbors array, and e may correspond to a quantity of banks comprising an on-chip memory of each graph core.

In some variations, the crossbar may further include a core shuffle level configured to shuffle neighbor indices annotated with originating line and lane to a graph core containing a corresponding vertex label.

In some variations, the shuffling of the neighbor indices may be performed based on a first $\log_2 p$ quantity of bits of the neighbor array, and p may correspond to a quantity of the plurality of graph cores.

In some variations, the plurality of graph cores may be implemented on a field programmable gate array (FPGA).

In some variations, the plurality of graph cores may be synthesized on the field programming gate array (FPGA) based on one or more user defined functions (UDFs) including a map function to produce updates to a source vertex label of each edge in the graph and a reduce function to aggregate updates into a single value for each vertex of the graph that is being updated.

In some variations, the graph processing algorithm may include one or more of breadth-first search (BFS), page rank (PR), weakly connected components (WCC), subgraph, inverse graph, in-degree, out-degree, incoming edges, outgoing edges, neighbors, is-reachable, shortest path, shortest path one to all, k shortest paths, strongly connected components, depth first traversal, and single source shortest path (SSSP).

In another aspect, there is provided a method for hardware accelerated graph processing. The method may include: partitioning a graph into a plurality of partitions; distributing, to each graph core of a plurality of graph cores, one or more partitions of the plurality of partitions such that each graph core executes a graph processing algorithm on one or more partitions of the plurality of partitions, the executing of the graph processing algorithm including the plurality of graph cores exchanging one or more vertex labels via a crossbar interconnecting the plurality of graph cores; and determining, based at least on a plurality of partial results received from the plurality of graph cores, a result of the graph processing algorithm.

In some variations, one or more features disclosed herein including the following features can optionally be included in any feasible combination. The partitioning of the graph may include partitioning, into a plurality of intervals, a plurality of vertices of the graph. The partitioning of the graph may further include partitioning each interval of the plurality of intervals into a plurality of sub-intervals. A size of each sub-interval of the plurality of sub-intervals may correspond to a size of a label scratch pad of each graph core. The label scratch pad may be an on-chip memory serving non-sequential read requests that occur during each iteration of the graph processing algorithm. Each graph core may process the one or more partitions by at least reading a partition specific interval of a vertex label array into the label scratch pad, reading vertex labels and pointers sequentially, reading a neighbors array of a current partition sequentially, placing a plurality of neighbor vertex identifiers in parallel through the crossbar to pass the plurality of neighbor vertex identifiers to a correct graph core, and retrieving, from the crossbar, a plurality of resulting neighbor vertex labels in an original order.

In some variations, each graph core of the plurality of graph cores may be coupled with a single memory channel upon which the plurality of partitions are distributed to the plurality of graph cores.

In some variations, the crossbar may include a bank shuffle level configured to receive route, from one graph core to another graph core, a neighbors array comprising a sequence of numbers serving as addresses to vertex labels in a vertex labels array of a corresponding partition. The routing may be performed based on a last $\log_2 e$ quantity of bits comprising the neighbors array, and e may correspond to a quantity of banks comprising an on-chip memory of each graph core. The crossbar may further include a core shuffle level configured to shuffle neighbor indices annotated with originating line and lane to a graph core containing a corresponding vertex label. The shuffling of the neighbor indices may be performed based on a first $\log_2 p$ quantity of bits of the neighbor array, and p may correspond to a quantity of the plurality of graph cores.

In another aspect, there is provided a computer program product including a non-transitory computer readable medium storing instructions. The instructions may cause operations may executed by at least one data processor. The operations may include: partitioning a graph into a plurality of partitions; distributing, to each graph core of a plurality of graph cores, one or more partitions of the plurality of partitions such that each graph core executes a graph processing algorithm on one or more partitions of the plurality of partitions, the executing of the graph processing algorithm including the plurality of graph cores exchanging one or more vertex labels via a crossbar interconnecting the plurality of graph cores; and determining, based at least on a plurality of partial results received from the plurality of graph cores, a result of the graph processing algorithm.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to graph processing, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Recent advances in graph processing on field programmable gate arrays (FPGAs) promise to alleviate performance bottlenecks with irregular memory access patterns. Such bottlenecks challenge performance for a growing number of important application areas like machine learning and data analytics. However, although field programmable field arrays (FPGAs) provide a promising solution through flexible memory hierarchies and massive parallelism, existing hardware accelerators for graph processing either use the off-chip memory bandwidth inefficiently or fail to scale well across memory channels. As such, in some example embodiments, hardware acceleration of graph processing may be achieved through hardware, such as field programmable gate arrays (FPGAs), that has been configured with a scalable graph processing framework. The scalable graph processing framework may combine multi-channel memory with asynchronous graph processing (e.g., for fast convergence on results) and a compressed graph representation (e.g., for efficient usage of memory bandwidth and reduced memory footprint). Moreover, the scalable graph processing framework may address common graph problems, such as breadth-first search, page rank, and weakly-connected components, through modular user-defined functions, a novel two-dimensional partitioning scheme, and a high-performance two-level crossbar design.

The irregular memory access and little computational intensity inherent to graph processing may impose significant performance challenges on conventional general purpose hardware such as central processing units (CPUs). Although field programmable gate arrays (FPGAs) promise to accelerate common graph problems like breadth-first search (BFS), page rank (PR), and weakly-connected components (WCC) through a flexible memory hierarchy (e. g., by low-latency on-chip memory) and massive parallelism, memory bandwidth remains the bottleneck of graph processing even for highly optimized field programmable gate array (FPGA) implementations.

Figure 2:
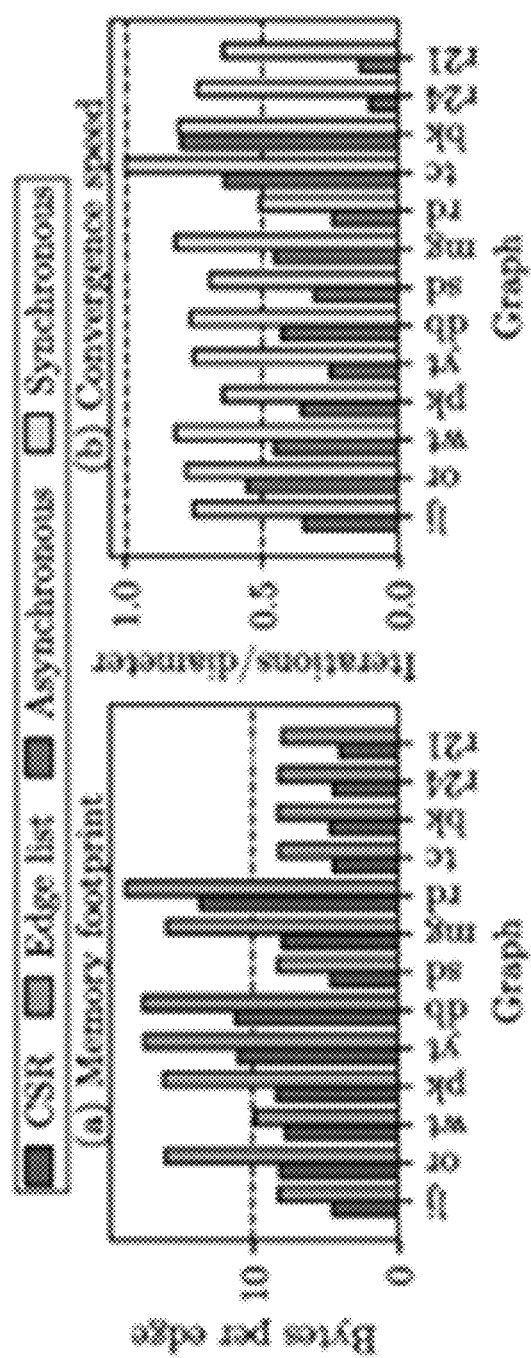
FIG. 2 depicts graphs illustrating the memory footprint and convergence speed for asynchronous processing on a compressed data structure, in accordance with some example embodiments.

The scalable graph processing framework described herein may implement asynchronous graph processing on compressed graph data structures in order to reduce the load on the memory subsystem. FIG. 2 depicts graphs illustrating the memory footprint and convergence speed for asynchronous processing on a compressed data structure. As shown in FIG. 2, for graphs with a large average degree, a compressed graph data structure (e.g., a compressed sparse row (CSR) data structure) may nearly half the quantity of bytes per edge that requires processing. Asynchronous processing may lead to a significant decrease in the number of processing iterations over the graph. Nevertheless, neither approaches have been successfully scaled to multiple memory channels, which limits graph processing performance on modern hardware. For example, for asynchronous graph processing, the challenge to scaling lies in handling the high-bandwidth data flow of vertex label reads and writes to on-chip scratch pads at scale. Meanwhile, graph compression thwarts efforts to scale to multiple memory channels due to the added design complexity and higher resource utilization associated with accessing a compressed graph data structure on-chip (e.g., to materialize compressed edges).

As such, in some example embodiments, the scalable graph processing framework described herein overcomes the obstacles associated with scaling asynchronous graph processing on compressed graph data structures to multiple memory channels, thereby further improving the performance of hardware accelerated graph processing. For example, the scalable graph processing framework may leverage the potential of combined asynchronous graph processing and graph compression (e.g., compressed sparse row (CSR) based graph compression) by including an asynchronous graph framework, a two-level vertex label crossbar, and a two-dimensional partitioning scheme for graph processing on multiple channels. A graph processing system incorporating the scalable graph progressing framework demonstrates significant scalability with a maximum speedup of 4.77× on dense graphs and an average speedup of 2.3× over conventional graph processing accelerators.

Figure 1:
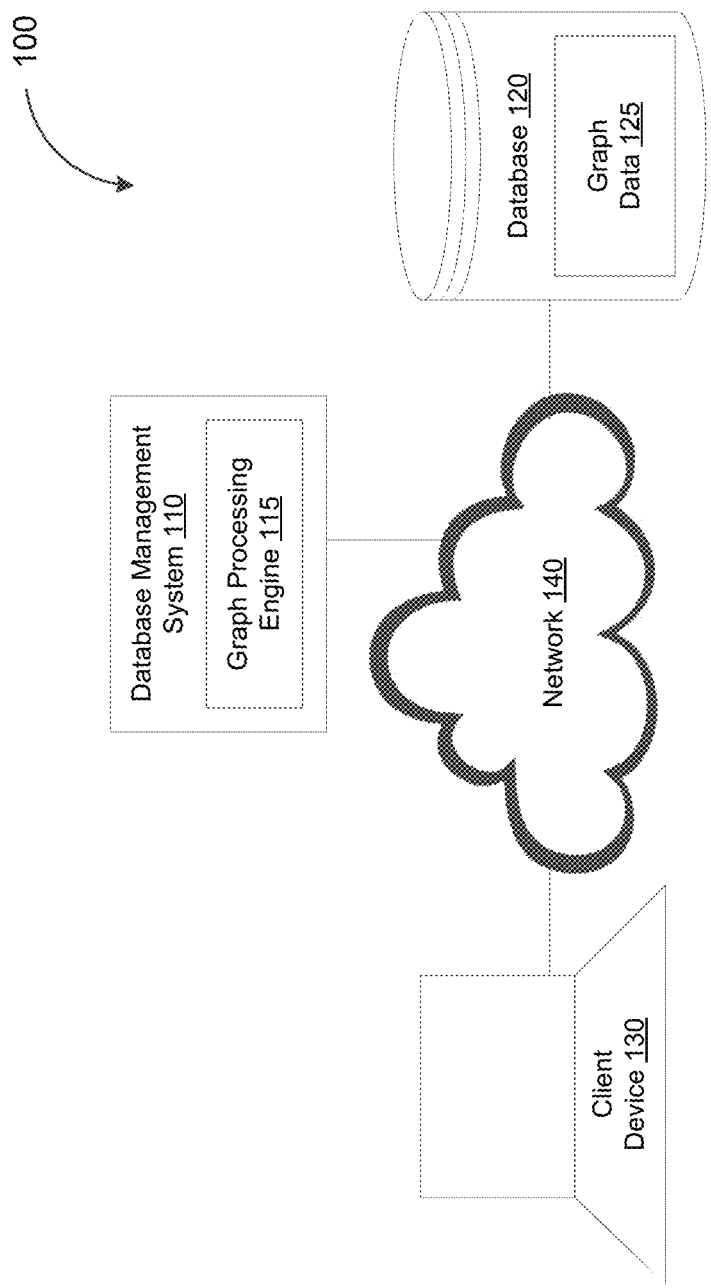
FIG. 1 depicts a system diagram illustrating an example of a database system, in accordance with some example embodiments.

FIG. 1 depicts a system diagram illustrating an example of a database system 100, in accordance with some example embodiments. Referring to FIG. 1, the database system 100 may include a database management system 110, a database 120 associated with the database management system 110, and a client device 130. As shown in FIG. 1, the database management system 110, the database 120, and the client device 130 may be communicative coupled via a network 140. In some cases, the database management system may also be communicatively coupled with the database 120 via a bus such as a peripheral component interconnect (PCI) bus, a peripheral component interconnect express (PCIe) bus, and/or the like. The database 120 may be a database capable of storing a graph data 125 including, for example, a graph database, an in-memory database, a relational database, a non-SQL (NoSQL) database, and/or the like. The client device 130 may be a processor-based device including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

As shown in FIG. 1, the database management system 110 may include a graph processing engine 115 configured to process, for example, at least a portion of the graph data 125 stored in the database 120. For example, the graph processing engine 115 may access the graph data 125 to perform one or more graph processing algorithms such as subgraph, inverse graph, in-degree, out-degree, incoming edges, outgoing edges, neighbors, is-reachable, shortest path, shortest path one to all, k shortest paths, single source shortest path, strongly connected components, depth first traversal, and breadth first traversal. In some example embodiments, the graph processing engine 115 may include one or more graph processing hardware accelerators (e.g., field programming gate arrays (FPGAs) and/or the like) implementing a scalable graph processing framework that combines multi-channel memory with asynchronous graph processing (e.g., for fast convergence on results) and a compressed graph representation (e.g., for efficient usage of memory bandwidth and recued memory footprint). In particular, to leverage the potential of combined asynchronous graph processing and graph compression (e.g., compressed sparse row (CSR) based graph compression), the scalable graph processing framework may include at least one of an asynchronous graph framework, a two-level vertex label crossbar, and a two-dimensional partitioning scheme for graph processing on multiple channels.

Figure 3:
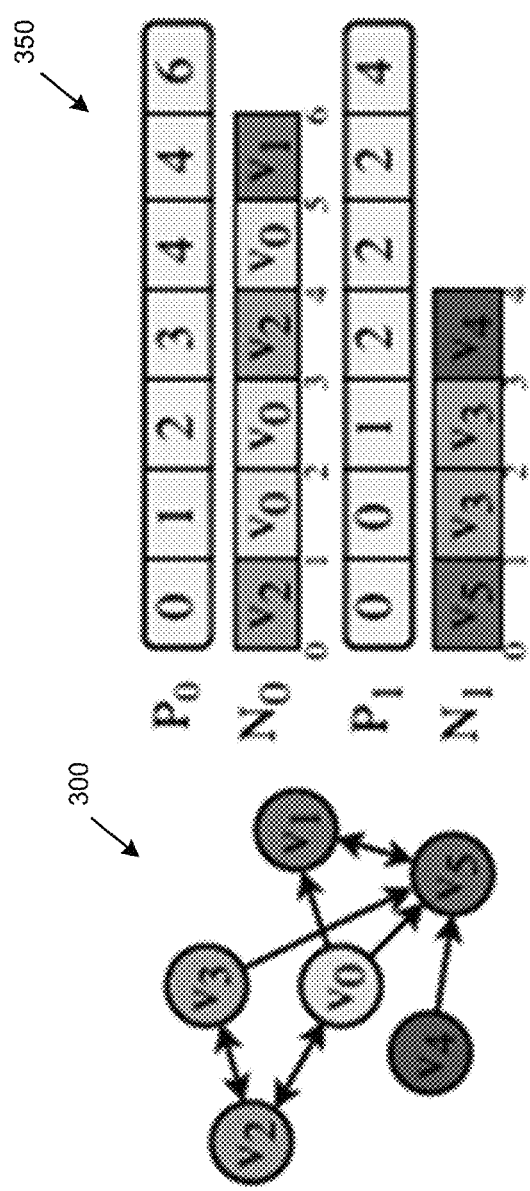
FIG. 3 a schematic diagram illustrating an example of a graph and a corresponding inverse horizontally-partitioned compressed sparse row (CSR) data structure, in accordance with some example embodiments.

FIG. 3 depicts a schematic diagram illustrating an example of a graph 300 and the corresponding inverse horizontally-partitioned compressed sparse row (CSR) structure 350. Graphs, such as the directed graph 300 shown in FIG. 3, are abstract data structures (e.g., G=(V,E)) including a vertex set V and an edge set E⊂V×V. To process a graph, conventional graph processing accelerators represents the graph in-memory either as an array of edges (e.g., an edge list) or a set of adjacency lists, with each adjacency list containing a corresponding vertex's neighboring vertices in the graph. In the scalable graph processing framework of the data processing engine 115, the adjacency list structure of a graph may be represented as a compressed sparse row (CSR) data structure, such as the inverse horizontally-partitioned compressed sparse row (CSR) structure 350 shown in FIG. 3. To allow for more meaningful graph processing, a label may be attached to each vertex. Moreover, the scalable graph processing framework of the data processing engine 115 may adopt a horizontal partitioning which, as shown in FIG. 3, includes partitioning the inverse edge set of a graph into intervals such that each interval contains the outgoing edges of the interval. As shown in FIG. 3, the values of the pointers array (P) at position i and i+1 delimit the neighbors (N) of the vertex $v_i$. Accordingly, for vertex $v_5$ in partition 1 these are the values of the neighbors array between 2 and 4 (i. e., $v_3$ and $v_4$). An alternative to horizontal partitioning is vertical partitioning, which includes dividing the vertex set of the graph into intervals such that each vertical partition contains the incoming edges of that interval. Interval-shard partitioning, which combines vertical partitioning and horizontal partitioning, is yet another approach.

Depending on the underlying graph data structure, graphs may be subjected to edge-centric processing or vertex-centric processing. Edge-centric processing treats the edges of a graph as graph primitives and thus operates on the graph by iterating over the edge list of the graph. Contrastingly, vertex-centric processing treats the vertices of a graph and their neighbors as graph primitives and iterates over an underlying adjacency lists data structure (e.g., a compressed sparse row (CSR) data structure). The vertex-centric approach may further adopt either a push- or a pull-based data flow. A push-based data flow denotes that updates to neighboring vertices are pushed along the edges in a forward direction whereas in a pull-based data flow updates are pulled along the inverse direction of the edges. The aforementioned update propagation may be performed asynchronously, where updates are applied directly to the working vertex label set whenever the updates are produced. Alternatively, update propagation may be performed synchronously, in which case the updates are applied after the iteration is finished.

As noted, in some example embodiments, the data processing engine 115 may operate on at least a portion of the graph data 125 stored in the database 120 to perform one or more graph processing algorithms. One example of a graph processing algorithm is a breadth first search wherein the data processing engine 115 traverses a graph to generate a visiting sequence in which the vertices of the graph are labeled with their distance (in length of the shortest path in number of edges) to a root vertex of the vertex. Another example of a graph processing algorithm is for the data processing engine 115 to identify the weakly-connected components (WCC) associated with each vertex in a graph. Here, two vertices are in a same weakly-connected component if an undirected path exists between the two vertices. Page rank is another example of a graph progressing algorithm in which the data processing engine 115 determines, based at least on Equation (1) below, the importance p of each vertex i∈V in a graph G.

$$p(i, t+1) = \frac{1-d}{|V|} + d \cdot \sum_{j \in N_G(i)} \frac{p(j, t)}{d_G(j)} \qquad (1)$$

wherein d of the neighbors $N_G$ over each iteration t.

Figure 4:
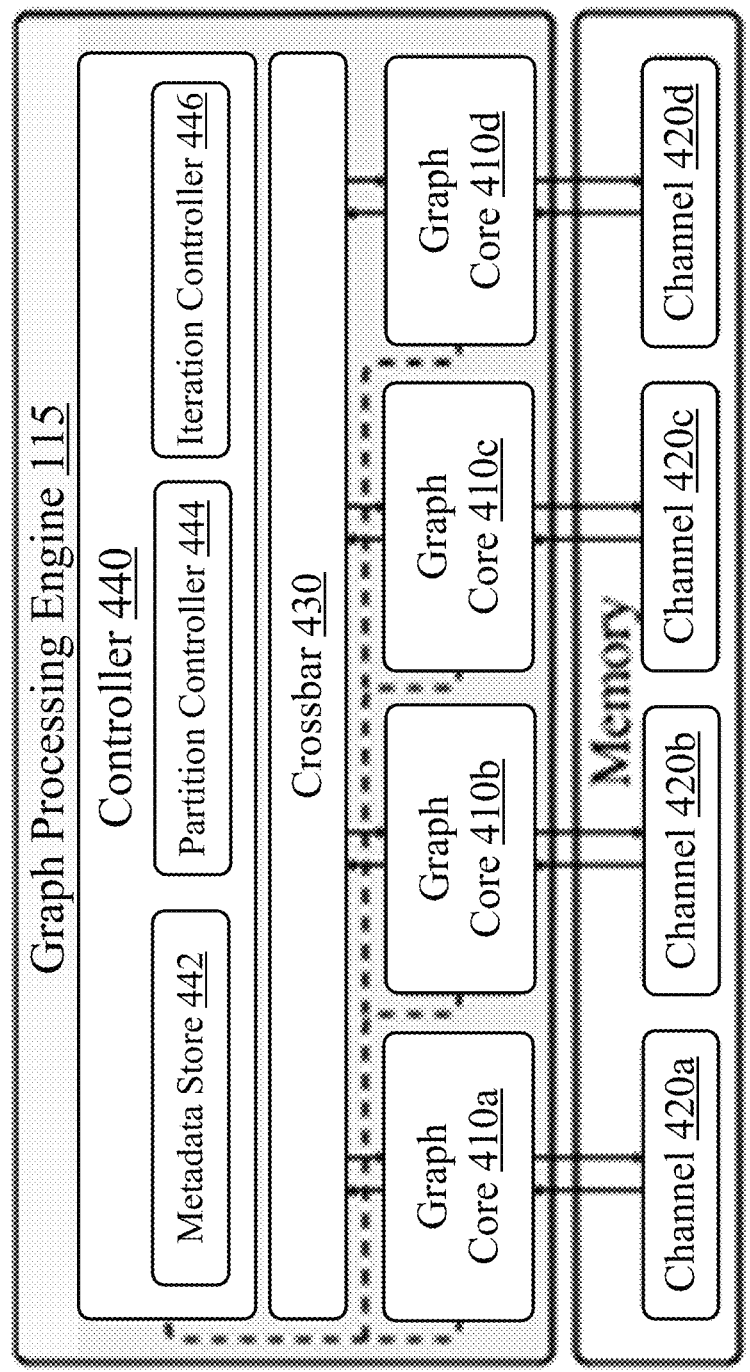
FIG. 4 depicts a block diagram illustrating an example of a scalable graph processing framework of a graph processing engine, in accordance with some example embodiments.

Referring now to FIG. 4, which depicts a block diagram illustrating the scalable graph processing framework of the graph processing engine 115, in accordance with some example embodiments. As shown in FIG. 4, the graph processing engine 115 may include a p-quantity of graph cores 410, which are matched to a p-quantity of memory channels 420. In the example shown in FIG. 4, the graph process engine 115 may include four graph cores 410 (e.g., a first graph core 410a, a second graph core 410b, a third graph core 410c, and a fourth graph core 410d) with four corresponding memory channels 420 (e.g., a first channel 420a, a second channel 420b, a third channel 420c, and a fourth channel 420d). Moreover, FIG. 4 shows that each graph core 410 may be coupled to a single memory channel 420. Accordingly, the first graph core 410a is coupled with the first channel 420a but not the second channel 420b, the third channel 420c, or the fourth channel 420d. Moreover, the first graph core 410a is able to read and write data on the first channel 420a but not the second channel 420b, the third channel 420c, or the fourth channel 420d. This one-to-one mapping between the graph cores 410 and the memory channels 420 may require the data processing engine 115 to operate on graphs that have been partitioned into at least a p-quantity of partitions. The partitioning of a graph into the p-quantity of partitions and the distribution of the p-quantity of partitions over the memory channels 420 are described in more details below. Nevertheless, it should be appreciated that because graph partitioning does not eliminate data dependencies between partitions, the graph processing engine 115 further includes a crossbar 430 (e.g., a two-level crossbar) to enable the exchange of vertex labels between the graph cores 410. As shown in FIG. 4, the graph processing engine 115 may include a controller 440, which may coordinate the operations of the graph cores 410 during the execution of a graph processing algorithm. For example, prior to the start of execution, the host code may pass parameters for each partition of the graph and optimization flags to the processor controller 440 for storage in a metadata store 442. When execution is triggered by the host code, the controller 440 may operate as a state machine to orchestrate the control signals for successive iterations of executing the graph processing algorithm over the graph.

Figure 5:
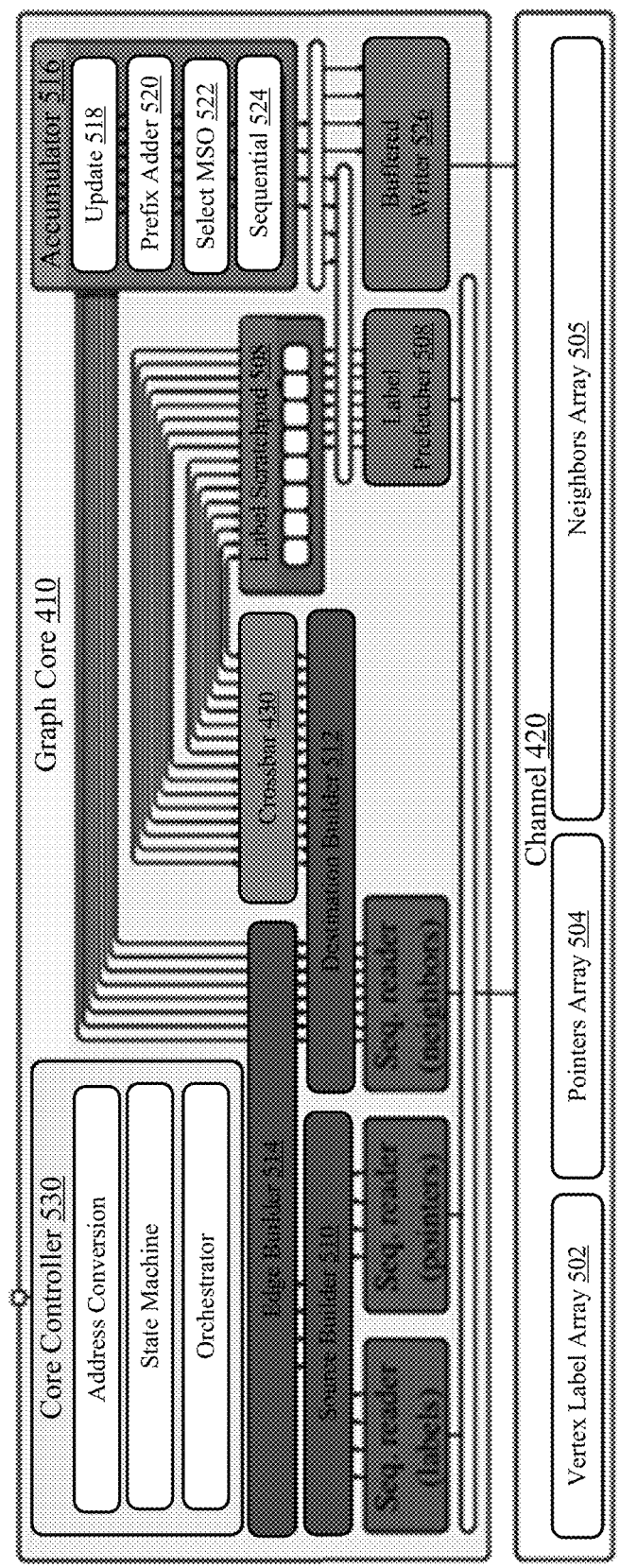
FIG. 5 depicts a block diagram illustrating an example of a graph core, in accordance with some example embodiments.

FIG. 5 depicts a block diagram illustrating an example of the graph core 410, in accordance with some example embodiments. As one of the basic building block of the graph processing engine 115, each graph core 410 may process graphs based on a vertex-centric iteration scheme and pull-based data flow. Moreover, each graph core 410 may operate on an inverse partitioned compressed sparse row (CSR) structure, such as the inverse horizontally-partitioned compressed sparse row (CSR) structure 350 shown in FIG. 3, having a single vertex label array 502 as well as a pointers array 504 and a neighbors array 505 for each partition.

In some example embodiments, the graph core 410 may process a partition of a graph in successive iterations, each of which having a prefetching phase and a processing phase. During the prefetching phase, a vertex label prefetcher 506 may read a partition specific interval of the vertex label array 502 into a label scratch pad 508 (e.g., an on-chip memory (e.g., block random access memory (BRAM)) split up into an e-quantity of banks (8 banks are shown in FIG. 5). The label scratch pad 508 may be used to serve all non-sequential read requests that occur during an iteration instead of off-chip dynamic random access memory (DRAM) at least because the on-chip memory (e.g., the block random access memory (BRAM)) may support a higher bandwidth and more predictable one cycle request latency independent of the access pattern.

Starting the data flow of the processing phase, a source builder 510 may read vertex labels and pointers sequentially. Vertex labels and pointers may be zipped to form a v-quantity of source vertices in parallel with a vertex index (generated on-the-fly), vertex label, inclusive left bound, and exclusive right bound of neighbors in each neighbors array 505. A destination builder 512 may read the neighbors array 505 of the current partition sequentially and place the e-quantity of neighbor vertex identifiers in parallel through the crossbar 430 in order to pass the vertex identifiers to the correct label scratch pad 508 bank of the correct graph core 410 while returning the resulting vertex labels in the original order. The vertex label annotated with the neighbor index is then passed to an edge builder 514, which may combine the source and destination vertices based on the left bound l and right bound r of the source vertex and the neighbor index j of the destination vertex as l<=j; j<r. Thus, the edge builder 514 may be able to output up to an e-quantity of edges with a maximum of v-quantity source vertices per clock cycle.

An accumulator 516 may take the e-quantity edges annotated with their source and destination vertex labels as input and updates vertices in accordance with the graph processing algorithm being performed. First, updates may be produced in an update stage 518 by applying the corresponding graph processing algorithm's update function for each edge in parallel. For breadth first search, this means taking the minimum of the source vertex label and destination vertex label plus 1. If the latter is smaller, the output is flagged as an actual update of the source vertex label. This operation may be crucial for graph processing algorithms that terminate when no more updates are produced in an iteration (e.g., breadth first search, weakly-connected components, and/or the like). The pairs of source vertex identifier and updated vertex labels are then passed to a prefix adder 520, which reduces the updates to the most significant element with the same source vertex identifier for each source vertex. The most significant entry is then selected by a v-quantity of selectors in the select MSO stage 522 of the accumulator 516 and passed on to the final sequential stage 524. Each selector may only selects pairs having i % v=I for source vertex index i and selector index I. The sequential stage 524 includes a v-quantity of sequential operators, which may reduce updates from subsequent cycles to the same vertex into a single update that is output when a new source vertex identifier is encountered or a higher source vertex identifier is encountered. Accordingly, the accumulator 516 may produce updates only when the new label is different based on the annotated edges, thus reducing the quantity of updates into a maximum of one update per source vertex.

Figure 6:
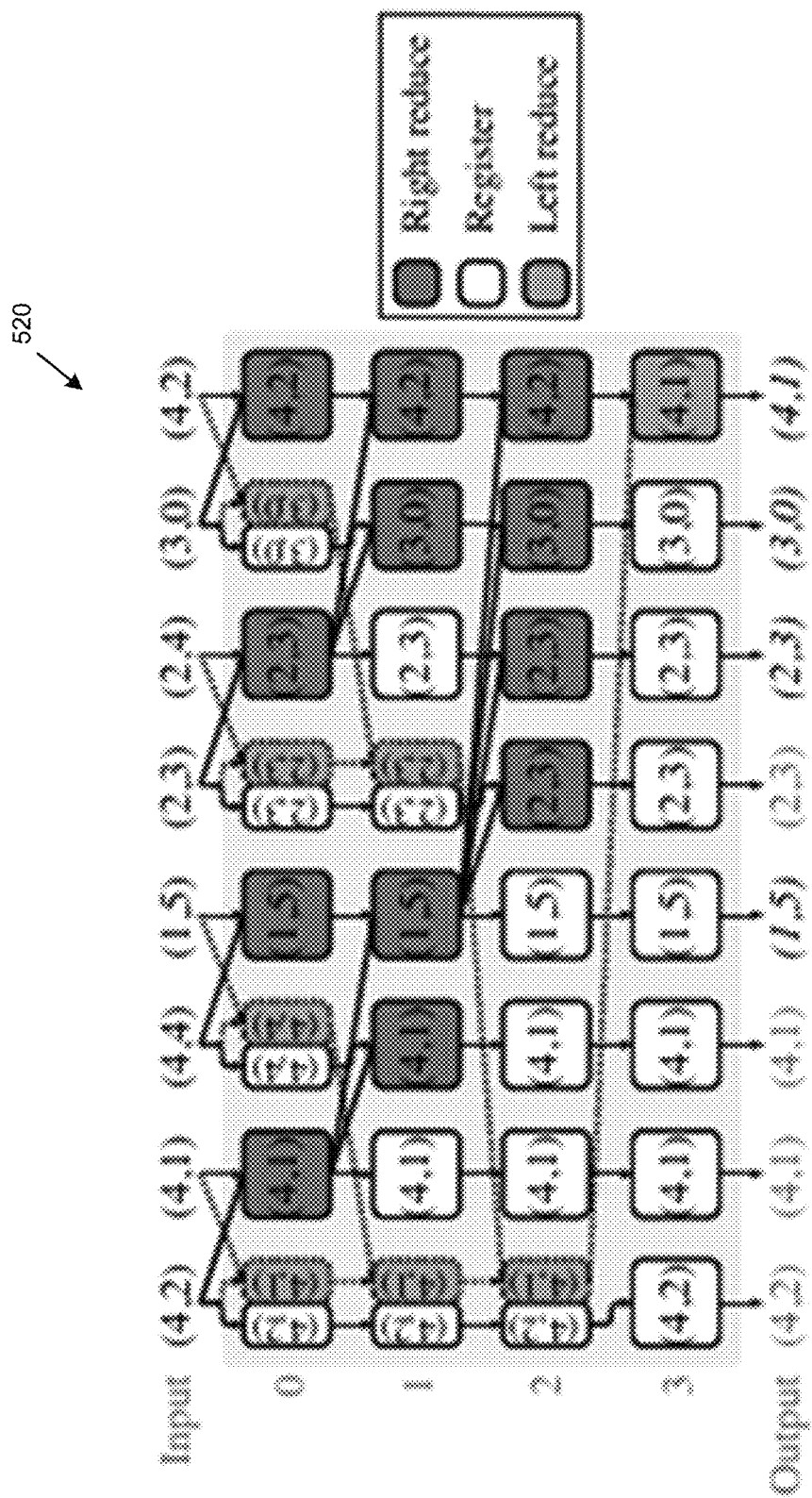
FIG. 6 depicts a block diagram illustrating an example of a parallel prefix-adder vertex-update accumulator, in accordance with some example embodiments.

FIG. 6 depicts a block diagram illustrating an example of the parallel prefix-adder vertex-update accumulator 516, in accordance with some example embodiments. As shown in FIG. 6, the accumulator 516 may include a suffix sub-accumulator (dotted outlines) in order to attain the correct results in certain edge cases and a merged signal for non-idempotent reduce operators like summation. The accumulator 516 takes an e-quantity of pairs of source vertex identifier and updated vertex label (split with a comma) and returns one updated vertex label as the right-most identifier-label pair per incoming source vertex identifier (italicized). The prefix-adder accumulator 516 may include an $(\log_2(e)+1)$ quantity of pipelined levels of registers (white) and reduce processing elements (PE). The registers may take a single identifier-label pair as an input and pass this input on in the next clock cycle. The reduce processing elements may take two identifier-label pairs as an input and combine them depending on the graph processing algorithm if the source vertex identifiers are equal. The result may be again put out in the next clock cycle. Right reduce processing elements may pass on the right identifier-label pair unmodified if the identifiers are unequal and left reduce processing elements may pass on the left pair. In this particular example, the parallel accumulator 516 could either be used, for example, for breadth first search or weakly-connected components, at least because the accumulator 516 uses minimum reduce processing elements, which outputs the minimum of the vertex labels if they should be combined. The connection pattern of the first $\log_2 e$ levels of the accumulator 516 may represent a Ladner-Fischer prefix-adder.

In addition to the prefix adder 520, a suffix sub-adder may be added to reduce all identifier-label pairs with source vertex identifier equal to the first one to the first element. In an additional pipeline operation, this suffix accumulation result is reduced with the last prefix accumulation result if there have been multiple different source vertex identifiers in the input. This operation may be performed because the sequential source vertex identifiers can overlap from the last one to the first one as a result of how the edge builder works. In this edge case, updated vertex labels might be missed because only the right-most vertex label of a source vertex identifier is further processed. Finally, two identifier-label pairs may be reduced if all pairs in between have the same source vertex identifier, which may be tracked using the merged signal described above. Once the accumulator 516 completes its update of vertices in accordance with the graph processing algorithm, the resulting updates may be fed back to a buffered writer 526 and into the label scratch pad 508 so they can be used immediately during the same iteration. The buffered writer 508 may collect all updates to the same cache line and writes them back to memory when an update to a new cache line is encountered.

Referring again to FIG. 5, in some example embodiments, the operations each individual graph core 420 may be orchestrated by a corresponding core controller 530. The core controller 530 may receive, from the controller 440 of the graph processing engine 115, one or more graph-wide parameters for the execution of the graph processing algorithm, such as the quantity of vertices, the quantity of edges, the address of the buffer in memory. The core controller 530 may also receive, from the controller 440 of the graph processing engine 115, one or more dynamic parameters such as the iteration number. The core controller 530 may, based on these parameters, initiate the prefetching phase followed by the processing phase. The core controller 530 may also compute the address of the data structure arrays. Finally, the core controller 530 may flushes the pipeline such that all updates for the current iteration are written back to memory before asserting a ready signal to initiate the next iteration.

Figure 7:
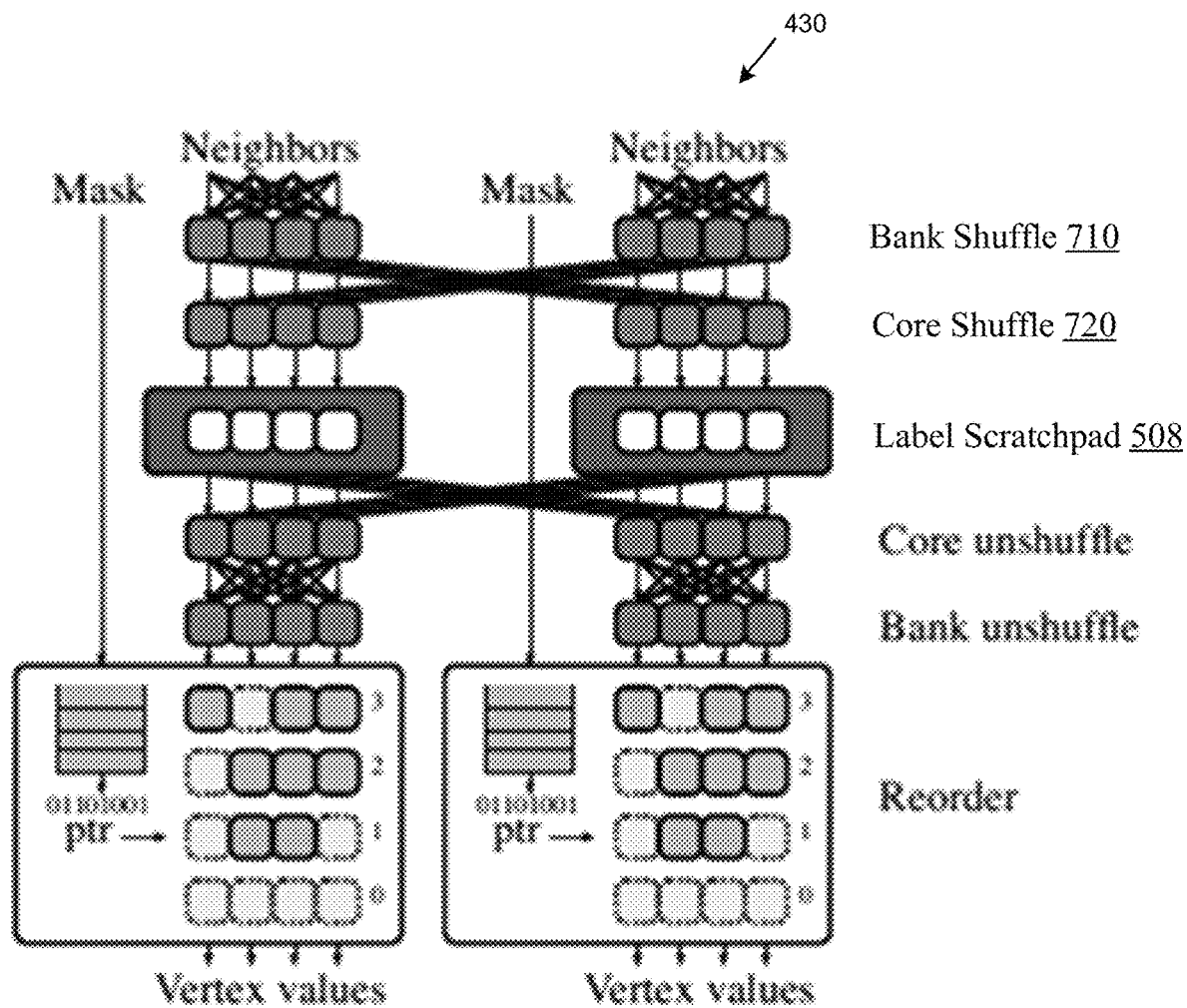
FIG. 7 depicts a schematic diagram illustrating an example shuffle reorder flow of a crossbar, in accordance with some example embodiments.

The single channel design shown in FIG. 4 in which each graph core 410 is coupled with a single memory channel 420 may enable efficient scaling with minimal overhead. However, requests to vertex labels may require communication between the graph cores 410, which may be conducted via the crossbar 430 (e.g., a scalable resource-efficient two level crossbar). In some example embodiments, the crossbar 430 may be configured to provide a high throughput in order to saturate the accumulators 516 of multiple graph cores 410 with annotated edges. To further illustrate, FIG. 7 depicts the shuffle reorder flow of the crossbar 430 for two graph cores 410 and e=4. As shown in FIG. 7, the crossbar 430 may include a bank shuffle level 710 and a core shuffle level 720. The first level of the crossbar 430, the bank shuffle level 710, may receive, during each cycle, an e-quantity of neighbors array 505 from the destination builder 512 of each graph core 410. The neighbors array 505 may be considered a patternless sequence of numbers, which serve as addresses to vertex labels in the corresponding vertex labels array 502. Before the processing of a partition starts, the partition's vertex labels may be prefetched to the label scratch pad 508 to serve these requests. Since the memory returns an e-quantity of neighbors per graph core per cycle at maximum throughput, an (e×p) quantity of requests have may be served by the label scratch pad 508 per cycle. Thus, the label scratch pad 508 of each graph core 410 is divided into an e-quantity of banks such that the requests can be served in parallel and the vertex labels are striped over these banks. In turn, this means that the last $\log_2 e$ bits of the neighbors index 515 are used to address the bank of the label scratch pad 508 that this vertex label can be requested from. Thus, the bank shuffle level puts each neighbors index 515 into the right bank lane based on its last $\log_2 e$ bits. Although doing so may introduce stalls because multiple neighbors from one line can go to the same bank, the e bank shufflers may be decoupled such that labels from later lines can overtake and already be answered to provide good load balancing for most graphs between banks.

The second level of the crossbar 430 is the core shuffle level 720, which shuffles the neighbor indices annotated with their originating line and lane to the graph core 420 containing the vertex label. Core addressing is done by the first $\log_2 p$ bits of the neighbors index. However, since the neighbor indices are already in the correct lane, core addressing may require a (p×e) quantity of core shufflers with a p-quantity of inputs. The results are additionally annotated with the originating graph core 410 and fed into the label scratch pad 508. The core shufflers 720 may also operate independently from each other, allowing neighbor indices to overtake each other. The label scratch pad 508 may return the vertex labels with a one cycle latency but retain the annotations. A second layer of the core shufflers 720 may route the vertex labels back to their original graph core 410. Thereafter, the vertex labels are unshuffled to the lane they originally came from and fed into a final reorder stage to restore the original sequence of the data, which may have changed because requests and responses overtake each other in the preceding operations.

The reorder stage may include a fixed quantity of lines, called "reorder slots," that may be kept open at a time (four is shown in FIG. 7). It is passed the valid signals of the incoming neighbors when they first enter the crossbar 430 and is arranged in a first-in-first-out (FIFO) order. The unshuffled labels are then still annotated with the line they originally came from modulo the number of reorder slots which is used as the address to place them in an on-chip memory (e.g., block random access memory (BRAM)). For example, there may be one block random access memory (BRAM) for each lane of reorder slots because each cycle may include writing one label and reading one label per lane. The reorder stage also maintains a pointer pointing to the currently to be output line and compares the valid signals of this line to the first-in-first-out (FIFO) output. If the first-in-first-out (FIFO) valid output and the valid signals forming the line are equal, the labels are output, the pointer is incremented, the first-in-first-out (FIFO) queue is popped, and the valid signals of the line are cleared. When the pointer is incremented above the last line, the pointer may overflow to 0.

Finally, the first-in-first-out (FIFO) queue of the reorder stage may also used to exert backpressure. If the first-in-first-out (FIFO) queue has as many elements as there are reorder slots, the ready signal is deasserted and all stages stop. To handle the one cycle latency of the label scratch pad 508, there is also an additional overflow register to accommodate results from the label scratch pad 508.

Figure 8:
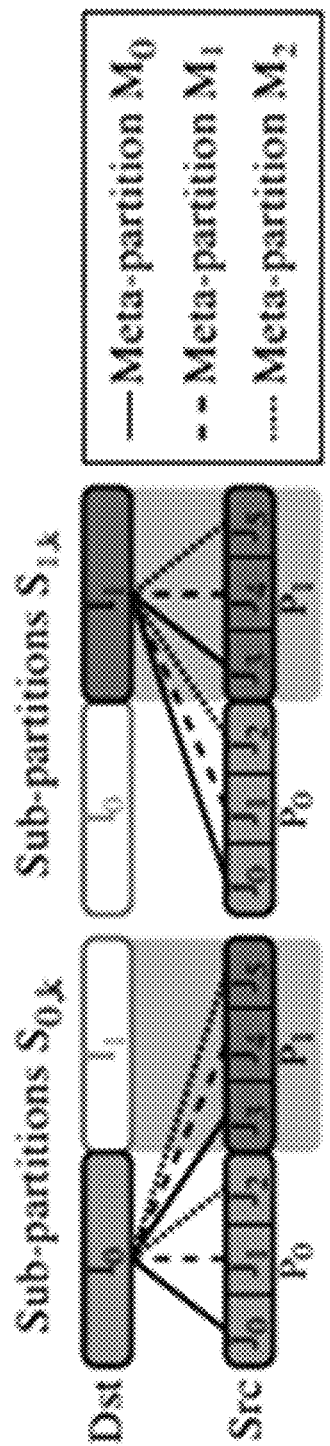
FIG. 8 depicts a schematic diagram illustrating an example graph partitioning scheme, in accordance with some example embodiments.

FIG. 8 depicts an example partitioning of an input graph for processing by the scalable graph processing framework of the graph processing engine 115, in accordance with some example embodiments. It should be appreciated that the partitioning scheme shown in FIG. 8 may further enhance the scalability of the graph processing engine 115. As shown in FIG. 8, the input graph may be partitioned in two dimensions. In the first dimensions, the set of vertices may be divided into a p-quantity of equal intervals $I_q$ (e.g., FIG. 8 shows $I_0$ and $I_1$ for p=2), one stored on each memory channel and processed by its corresponding graph core $P_q$. The second dimension of partitioning divides each vertex interval into an l-quantity of equal sub-intervals $J_l$ (e.g., FIG. 8 shows $J_0$ to $J_5$ for l=3) that fit into the label scratch pad of the graph core $P_q$. Accordingly, one sub-partition $S_{i,j}$ may be generated for each pair of interval $I_i$ and sub-interval $J_j$ containing every edge with destination vertices in $I_i$ and source vertices in $J_j$ and rewrite the neighbor indices in the resulting compressed graph structure (e.g., compressed sparse row (CSR) data structure) such that the requests are shuffled to the correct graph core by the two level crossbar (e.g., the first $\log_2 p$ bits are the graph core index) and subtract the offset of the respective sub-interval $J_j$. Sub-partitions $S_{q,q*l}$ for each $q \in [0, q)$ additionally form a meta-partition $M_p$. During execution, all sub-intervals $J_{q*l}$ are prefetched by their respective graph core q before processing of all sub-partitions of meta-partition $M_q$ is triggered.

Each graph core may write all label updates to off-chip memory through the buffered writer while processing a partition. Immediate updates is one example optimization strategy in which updates are written immediately back to the vertex label scratch pad if they are part of the current partition. Thus, with this optimization, on-chip memory (e.g., block dynamic access memory (BRAM)) and off-chip memory may remain in sync. Nevertheless, at the beginning of processing a partition, the vertex label set may be pre-fetched unnecessarily even if the labels are already present in on-chip memory (e.g., block random access memory (BRAM)). Thus, in some instances, pre-fetching may be omitted as a light-weight control flow optimization in conjunction with immediate updates if the vertex label set is already present in the label scratch pad. As yet another example optimization strategy, stride mapping may be applied to improve partition balance. Because the graph cores work in lock-step on the meta-partitions, an imbalance between partitions may lead to significant idle time. Stride mapping may include a semi-random shuffling of the vertex identifiers, which may be performed before applying the partitioning to create a new vertex ordering with a constant stride (e.g., 100 may result in $v_0, v_{100}, v_{200}, \ldots$).

Figure 9:
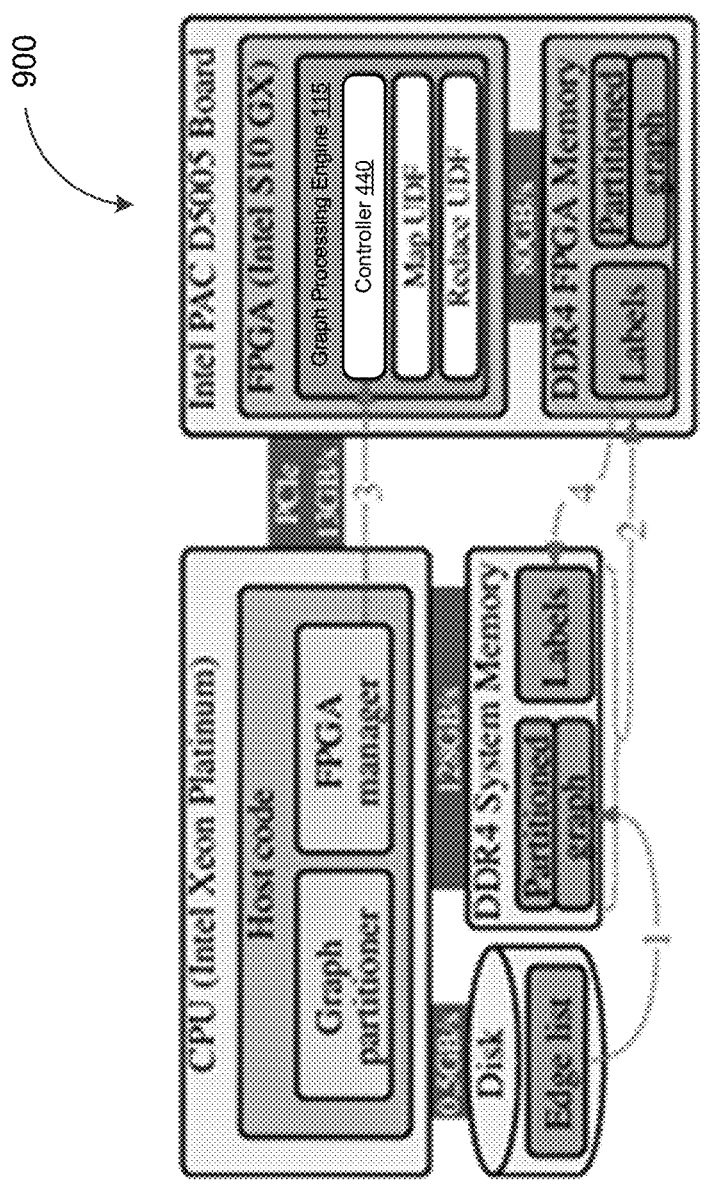
FIG. 9 depicts a block diagram illustrating an example of a graph processing system including a deployment of a scalable graph processing framework, in accordance with some example embodiments.

FIG. 9 depicts a block diagram illustrating an example of a graph processing system 900 including a deployment of a scalable graph processing framework, in accordance with some example embodiments. As shown in FIG. 9, the graph processing system 900 may include a central processing unit (CPU), an accelerator board hosting one or more field programmable gate arrays (FPGAs) running the scalable graph processing framework described herein, and a memory serving as intermediate data storage for graph data during processing. The central processing unit (CPU) may manage the execution on the field programmable field arrays (FPGAs) and may also be responsible for the loading and partitioning of graph data. To execute a particular workload with a particular graph, the scalable graph processing framework may be first synthesized based on one or more user defined functions (UDFs) associated with the map and reduce operators in the graph core accumulator before the synthesized design may be programmed to the field programmable gate arrays (FPGAs). The map user defined function (UDF) may produce updates to the source vertex label for each edge, while the reduce user defined function (UDF) may aggregate updates into a single value for each to be updated vertex. For a switch from one graph processing algorithm to another, such as from a breadth-first search (BFS) to weakly connected components (WCC), the reduce user defined function (UDF) may remain the same whereas a single line has to be changed for the map user defined function. The page rank algorithm may require more significant changes to the map user defined function (UDF) and replacing the reduce user defined function (UDF) with summation. Additionally, the page rank algorithm may alternatingly operate on two separate vertex label arrays.

For execution of the programmed algorithm on a particular graph data set, the edge list (or any other representation) of the graph may be read from disk to the central processing unit (CPU) and partitioned by a graph partitioner in the hose code according to the parameters of the scalable graph processing framework. Additionally, the vertex labels of the graph may be initialized with graph problem specific values. The graph partitions and vertex labels are then transferred to the respective channels of the field programmable field array (FPGA) memory. Thereafter, the parameters of the graph may be passed to the scalable graph processing framework via a control interface, thereby triggering execution of the corresponding graph processing algorithm. After the execution is complete, the results of the graph processing algorithm may be read back to central processing unit (CPU) memory and used for further processing. If desired, the partitioned graph may be used (and reused) multiple times by reloading the new vertex labels to trigger the execution of the same or different graph processing algorithm on the graph.

Table I below depicts various examples of system configurations for implementing the graph processing system 900 shown in FIG. 9 to perform various graph processing algorithms such as breadth-first search (BFS), page rank (PR), and weakly connected components (WCC). Each system variant shown in Table 1 may utilize different quantities of memory channels p for 1, 2, and 4 channels. Each variant may have a total vertex label scratch pad size of $2^{21}$, 16 scratch pad banks, and 8 vertex pipelines. All types including pointers, vertex identifiers, and vertex labels are 32-bit unsigned integers, except for page rank (PR) vertex labels, which are 64-bit and includes the degree of the vertex as well as its page rank value. Lastly, the depth of the reorder stage is set to 32. This parameterization results in a moderate resource utilization with rising look-up-table (LUT) and register (Regs.) utilization, almost constant on-chip memory (e.g., block random access memory (BRAM) utilization because scratch pad size is shared between the graph cores, and little clock frequency degradation. The page rank configuration is associated with significantly higher resource utilization due to the doubled vertex label size.

TABLE I

| Problem | p | LUTs | Regs. | BRAM | DSPs | Clock freq. |
|---|---|---|---|---|---|---|
| BFS | 1 | 19% | 13% | 40% | 0% | 192 MHz |
| BFS | 2 | 30% | 23% | 41% | 0% | 186 MHz |
| BFS | 4 | 58% | 47% | 43% | 0% | 170 MMz |
| PR | 1 | 26% | 14% | 66% | <1% | 174 MHz |
| PR | 2 | 43% | 43% | 67% | <1% | 162 MHz |
| PR | 4 | 82% | 69% | 72% | 1% | 143 MHz |
| WCC | 1 | 20% | 14% | 40% | 0% | 191 MHz |
| WCC | 2 | 30% | 23% | 41% | 0% | 183 MHz |
| WCC | 4 | 55% | 45% | 43% | 0% | 161 MHz |

Graph data sets used to benchmark the graph processing system 900 are shown in Table II. This selection represents the most important graphs, currently considered, found by a recent survey. Two important aspects when working with these graphs are their directedness and the choice of root vertices (e.g., for breadth-first search (BFS) or single source shortest path (SSSP)), because they can have a significant impact on performance. Table II also shows graph properties, such as degree distribution and average degree, that are useful in explaining performance effects observed in the graph processing system 900 and the scalable graph processing framework implemented therein.

TABLE II

| Name | |V| | |E| | Dir. | Degs. | $D_{avg}$ | ø | SCC |
|---|---|---|---|---|---|---|---|
| live-journal (lj) | 4.8M | 69.0M | ○ | | 14.23 | 20 | 0.79 |
| orkut (or) | 3.1M | 117.2M | ● | | 76.28 | 9 | 1.00 |
| wiki-talk (wt) | 2.4M | 5.0M | ○ | | 2.10 | 11 | 0.05 |
| pokee (pk) | 1.6M | 30.6M | ● | | 37.51 | 14 | 1.00 |
| youtube (yt) | 1.2M | 3.0M | ● | | 5.16 | 20 | 0.98 |
| dbip (db) | 426.0K | 1.0M | ● | | 4.93 | 21 | 0.74 |
| slashdot (sd) | 82.2K | 948.4K | ○ | | 11.54 | 13 | 0.87 |
| mouse gene (mg) | 45.1K | 14.5M | ● | | 643.26 | 11 | 0.95 |
| roadnet-ca (rd) | 2.0M | 2.8M | ● | | 2.81 | 849 | 0.99 |
| top-cats (tc) | 1.8M | 28.5M | ○ | | 15.92 | 288 | 1.00 |
| berk-stan (bk) | 685.2K | 7.6M | ○ | | 11.09 | 714 | 0.49 |
| rmat 24-16 (r24) | 16.8M | 268.4M | ○ | | 16.00 | 19 | 0.02 |
| rmat-21-86 (r21) | 2.1M | 180.4M | ○ | | 86.00 | 14 | 0.10 |

Figure 10:
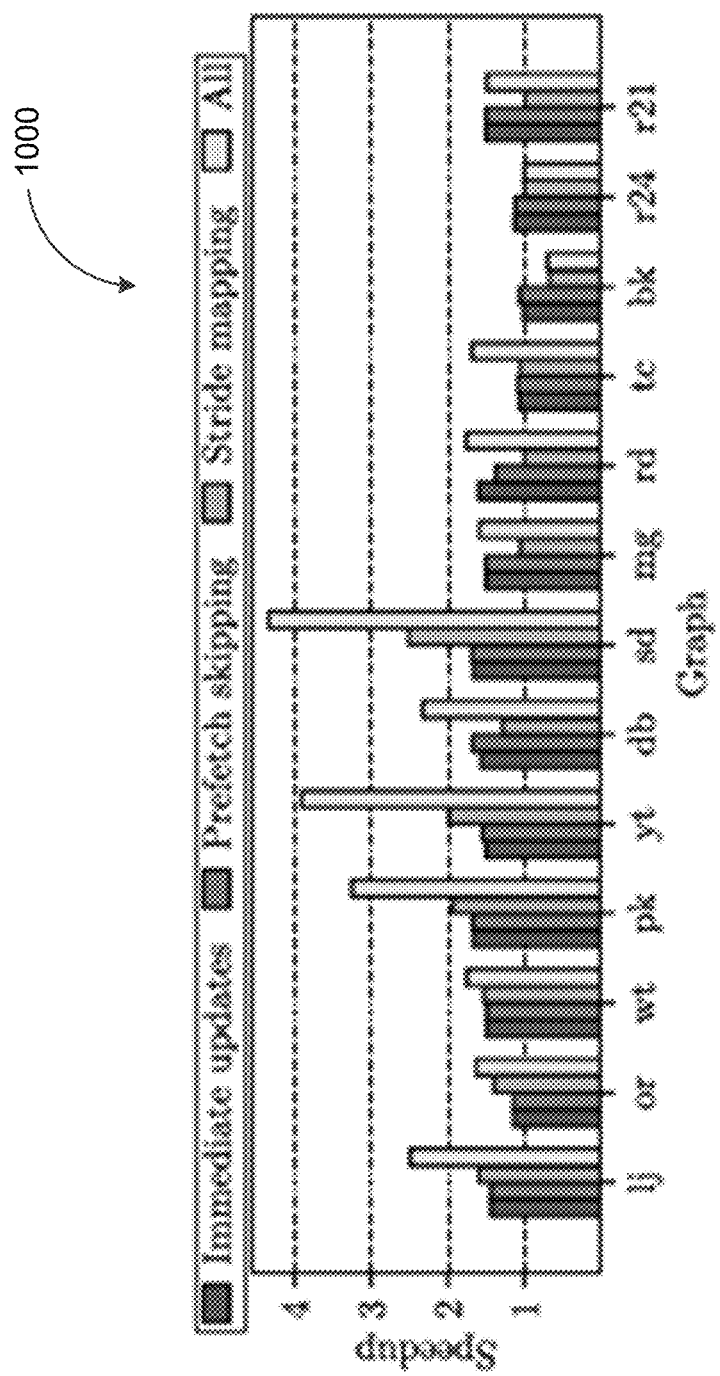
FIG. 10 depicts a graph illustrating the effects of different optimization strategies for a scalable graph processing framework, in accordance with some example embodiments.

Dir.: Directed;
Degs.: Degree distribution on log. scale;
SCC: Ratio of vertices in the largest strongly connected component to n;
○: yes,
●: no FIG. 10 depicts a graph 1000 illustrating the effects of different breadth-first search optimizations when applied to the scalable graph processing framework. These measurements are performed on a four memory-channel system and normalized to measurements with all optimizations turned off. The immediate updates optimization ensures that updates to the vertex labels of the current partition interval are written back to the scratch pad immediately, instead of just being written back to memory. This makes updates available earlier and leads to faster convergence for almost all graphs. Only the berk-stan graph does not benefit from this optimization, which may be due to a specific combination of graph structure and selected root vertex. The prefetch skipping optimization skips the prefetch phase of each iteration if intermediate updates are enabled. Hence, the prefetch skipping measurements have intermediate updates enabled. Additionally, prefetch skipping only works on graphs with a single partition. Prefetch skipping is a lightweight control flow optimization that sometimes leads to small performance improvements. Lastly, stride mapping tries to optimize partition balance. Whenever partitions can be balanced (e.g., youtube or slash-dot graphs), the performance of the system improves significantly. However, in rare cases (e. g., berk-stan graph) this may lead to performance degradation because with asynchronous graph processing, result convergence is dependent on vertex order and a beneficial vertex order may be shuffled by stride mapping. Accordingly, it may be beneficial if high degree vertices are at the beginning of the vertex sequence for faster convergence. In single channel measurements (not shown due to brevity), single channel performance was better without stride mapping for almost all graphs. This outcome is expected because partition balance is only important between channels but not between sub-partitions.

Figure 11:
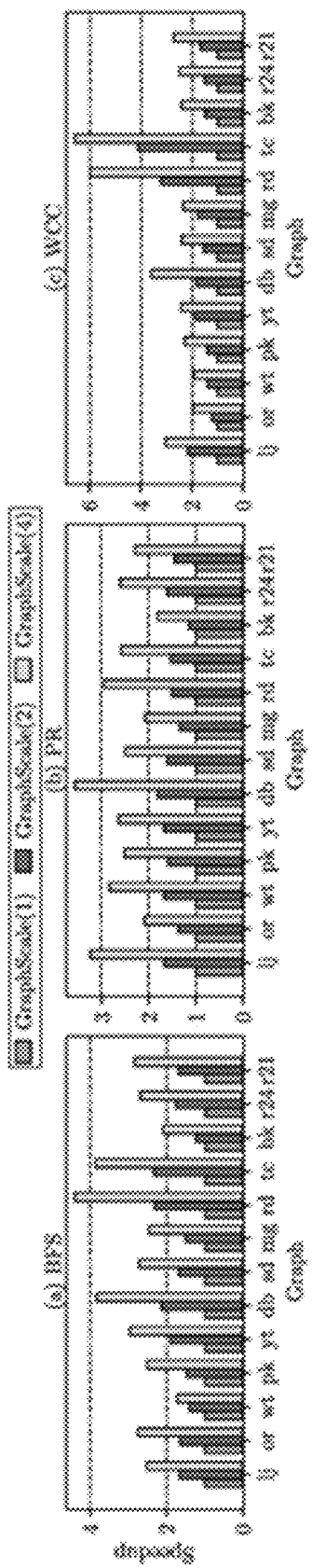
FIG. 11 depicts graphs illustrating the scalability of a scalable graph processing framework, in accordance with some example embodiments.

FIG. 11 depicts graphs illustrating the scalability of the scalable graph processing framework from a single memory channel up to four memory channels as speed-up over the baseline of single channel operation for various graph processing algorithms such as breadth-first search (BFS), page rank (PR), and weakly connected components (WCC). For the single-channel implementation, the stride mapping optimization is disabled. Otherwise, all aforementioned optimizations are enabled. The measurements shown in FIG. 11 indicate that there is some dependence between scaling overhead, speedup, and the graph data itself, which may be due to partition balance but is largely influenced by the density (i. e., average degree) of the graph data (e.g., for breadth-first search (BFS)). Scalability speedups for weakly connected components (WCC) are similar to the breadth-first search (BFS) measurements besides the even more pronounced super-linear scaling present in some datasets (e.g., roadnet-ca and top-cats).

The performance of the scalable graph processing framework described herein may be compared to other existing graph accelerators, such as HitGraph and ThunderGP, using the performance measure millions of traversed edge per second (MTEPS) defined by the Graph500 benchmark as $$\frac{|E|}{t_{exec}}$$

with runtime denoted as $t_{exec}$. A higher value is therefore better for this performance metric, which is different than the MTEPS* definition $$|E| \times \frac{i}{t_{exec}}$$

with number of iterations i used by HitGraph and ThunderGP. The MTEPS* metric eliminates number of iterations in favor of showing raw edge processing speed. However, faster convergence to results due to lower number of iterations has more impact on actual runtime than usually smaller differences in raw edge processing speed.

Figure 12:
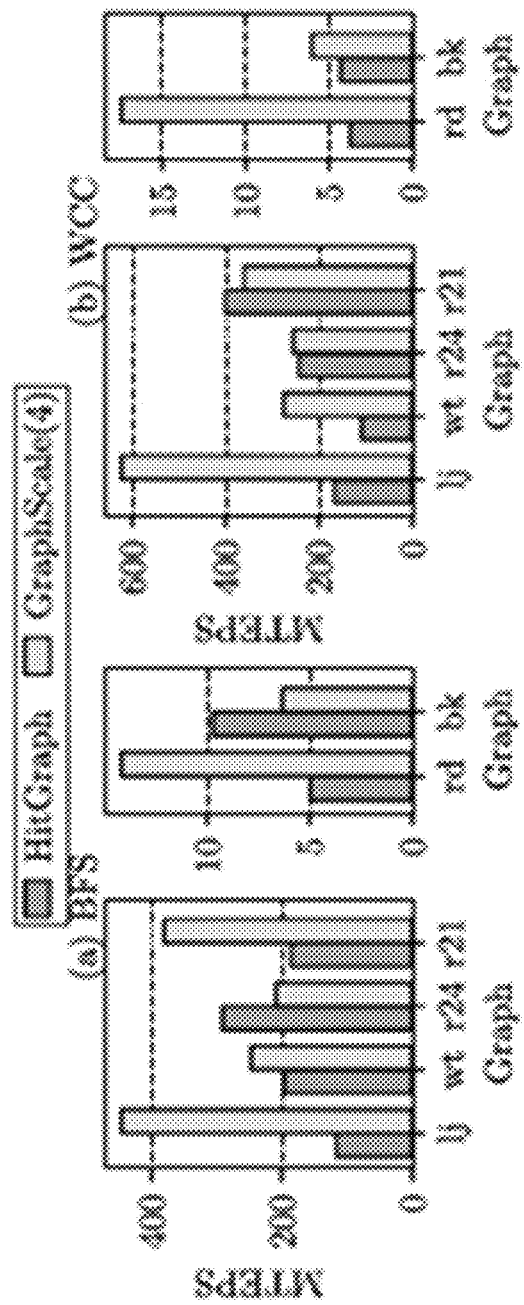
FIG. 12 depicts graphs illustrating a performance comparison between different graph processing accelerators, in accordance with some example embodiments.

FIG. 12 depicts graphs illustrating a performance comparison between four channel systems implementing the scalable graph processing framework described herein and HitGraph. Overall, the scalable graph processing framework described herein exhibits an average performance improvement over HitGraph of 1.89 for breadth-first search (BFS) and 2.38 for weakly connected components (WCC). As already shown in FIG. 11, the present framework benefits from denser graphs like live-journal in contrast to a sparse graph like wiki-talk. The present framework also exhibits superior scalability for the roadnet-ca graph.

Figure 13:
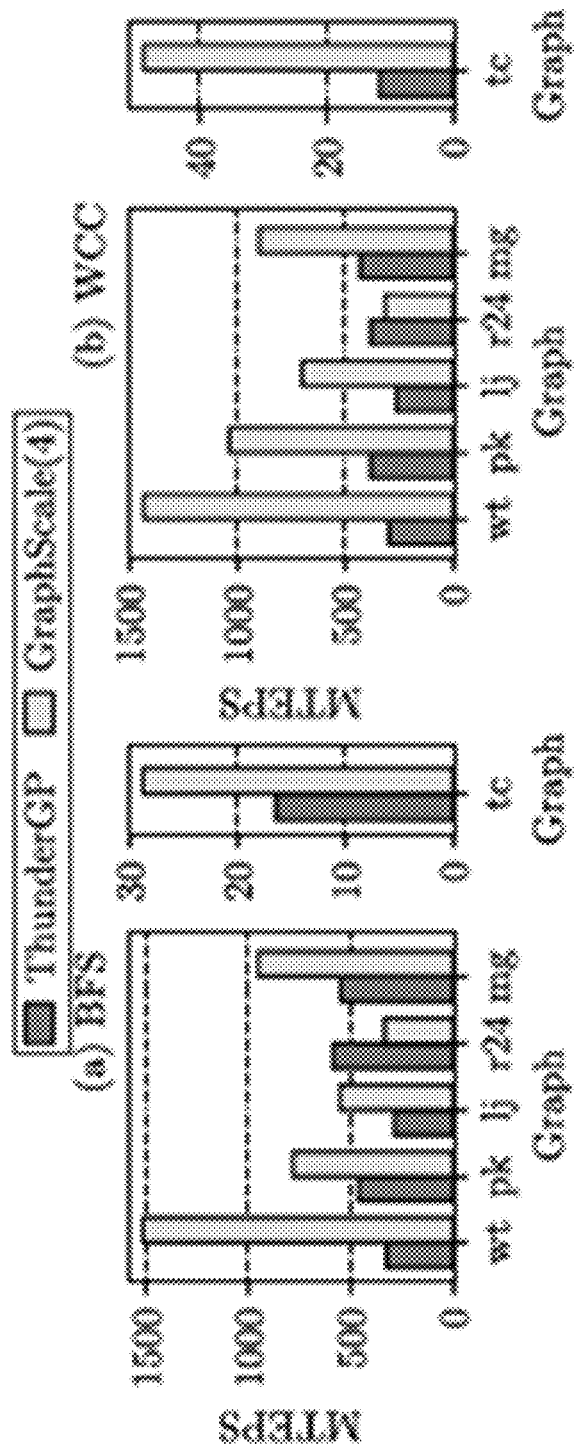
FIG. 13 depicts graphs illustrating a performance comparison between different graph processing accelerators, in accordance with some example embodiments.

FIG. 13 depicts graphs illustrating a performance comparison between four channel systems implementing the scalable graph processing framework described herein and ThunderGP. As shown in FIG. 13, the present system exhibits a speedup over ThunderGP of 2.05 and 2.87 for breadth-first search (BFS) and weakly connected components (WCC), respectively. The vertex range compression makes the wiki-talk graph much denser which present framework benefits from. Overall, the scalable graph processing framework described herein is associated with an average speedup of 2.3 over conventional graph processing accelerators HitGraph and ThunderGP with a maximum speedup of 4.77 for breadth-first search (BFS) on the wiki-talk graph over ThunderGP. In terms of scalability, the present framework realizes performance benefits from denser graphs in general (e. g., orkut and dblp graphs).

Figure 14:
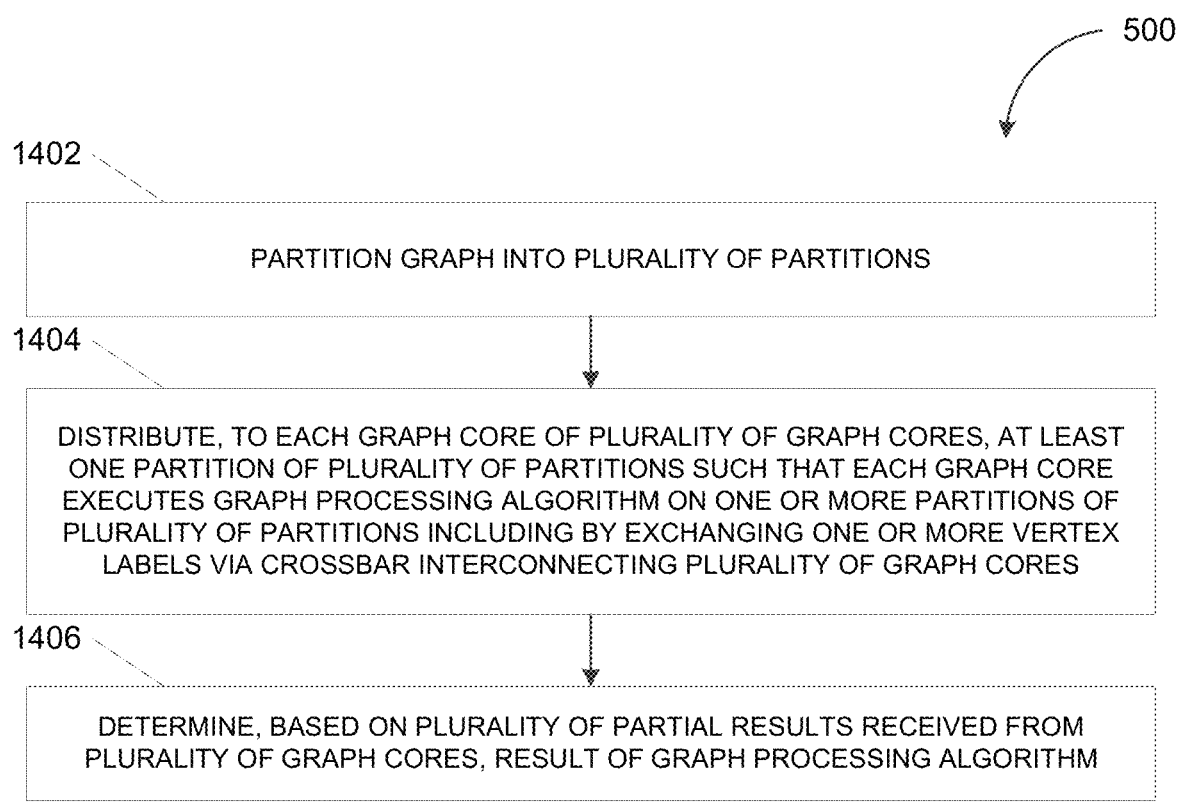
FIG. 14 depicts a flowchart illustrating an example of a process for graph processing, in accordance with some example embodiments.

FIG. 14 depicts a flowchart illustrating an example of a process 1400 for graph processing, in accordance with some example embodiments. Referring to FIGS. 1-14, the process 1400 may be performed by the graph processing engine 115 in order to perform, on at least a portion of the graph data 125 in the database 120, one or more graph processing algorithms such as breadth-first search (BFS), page rank (PR), and weakly connected components (WCC). Other examples of graph processing algorithms include subgraph, inverse graph, in-degree, out-degree, incoming edges, outgoing edges, neighbors, is-reachable, shortest path, shortest path one to all, k shortest paths, strongly connected components, depth first traversal, and single source shortest path.

At 1402, the graph processing engine 115 may partition a graph into a plurality of partitions. For example, in some example embodiments, the graph processing engine 115 may adopt a two-dimensional partitioning scheme. For example, in the first dimensions, the set of vertices of a graph may be divided into a p-quantity of equal intervals $I_q$ (e.g., FIG. 8 shows $I_0$ and $I_1$ for p=2) with each interval being stored on the memory channel of and processed by a corresponding graph core $P_q$. In the second dimension, each vertex interval may be further divided into an l-quantity of equal sub-intervals $J_l$ (e.g., FIG. 8 shows $J_0$ to $J_5$ for l=3) that fit into the label scratch pad of the graph core $P_q$. Accordingly, a single sub-partition $S_{i,j}$ may be generated for each pair of interval $I_i$ and sub-interval $J_i$ containing every edge with destination vertices in $I_i$ and source vertices in $J_i$ and rewrite the neighbor indices in the resulting compressed graph structure (e.g., compressed sparse row (CSR) data structure) such that the requests are shuffled to the correct graph core by the two level crossbar (e.g., the first $\log_2 p$ bits are the graph core index) and subtract the offset of the respective sub-interval $J_i$. Sub-partitions $S_{q,q*1}$ for each q∈[0, q) additionally form a meta-partition $M_{q'}$.

At 1404, the graph processing engine 115 may distribute, to each graph core of a plurality of graph cores, at least one partition such that each graph core executes a graph processing algorithm on one or more partitions of the plurality of partitions including by exchanging one or more vertex labels via a crossbar interconnecting the plurality of graph cores. In some example embodiments, the graph processing engine 115 may include a p-quantity of graph cores 410 having a one-to-one mapping to a p-quantity of memory channels 420. Accordingly, to execute a graph processing algorithm on a graph, the graph processing engine 115 may partition the graph into a p-quantity of partitions, which are then distributed over the memory channels 420 for processing by the corresponding graph cores 410. Because graph partitioning does not eliminate data dependencies between individual partitions, the graph processing engine 115 further includes the crossbar 430 (e.g., a two-level crossbar) to enable the exchange of vertex labels between the graph cores 410.

In some example embodiments, each graph core 410 may process a graph partition in successive iterations, each of which having a prefetching phase and a processing phase. During the prefetching phase, the vertex label prefetcher 506 may read a partition specific interval of the vertex label array 502 into the label scratch pad 508. During the subsequent processing phase, the source builder 510 may read vertex labels and pointers sequentially. Meanwhile, the destination builder 512 may read the neighbors array 505 of the current partition sequentially and place the e-quantity of neighbor vertex identifiers in parallel through the crossbar 430 in order to pass the vertex identifiers to the correct label scratch pad 508 bank of the correct graph core 410 while returning the resulting vertex labels in the original order. The vertex label annotated with the neighbor index is then passed to the edge builder 514, which may combine the source and destination vertices based on the left bound l and right bound r of the source vertex and the neighbor index j of the destination vertex as l<=j; j<r. The accumulator 516 may take the e-quantity edges annotated with their source and destination vertex labels as input and updates vertices in accordance with the graph processing algorithm being performed.

At 1406, the graph processing engine 115 may determine, based at least on a plurality of partial results received from the plurality of graph cores, a result of the graph processing algorithm. For example, as shown in FIG. 9, once the execution of the graph algorithm at each graph core 410 is complete, the results of the graph processing algorithm may be read back to central processing unit (CPU) memory and used for further processing. In some cases, the partitioned graph may be used (and reused) multiple times by reloading the new vertex labels to trigger the execution of the same or different graph processing algorithm on the graph.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: partitioning a graph into a plurality of partitions; distributing, to each graph core of a plurality of graph cores, one or more partitions of the plurality of partitions such that each graph core executes a graph processing algorithm on one or more partitions of the plurality of partitions, the executing of the graph processing algorithm including the plurality of graph cores exchanging one or more vertex labels via a crossbar interconnecting the plurality of graph cores; and determining, based at least on a plurality of partial results received from the plurality of graph cores, a result of the graph processing algorithm.

Example 2: The system of Example 1, wherein the partitioning of the graph includes partitioning, into a plurality of intervals, a plurality of vertices of the graph, and wherein the partitioning of the graph further includes partitioning each interval of the plurality of intervals, a plurality of sub-intervals.

Example 3: The system of Example 2, wherein a size of each sub-interval of the plurality of sub-intervals corresponds to a size of a label scratch pad of each graph core, and wherein the label scratch pad comprises an on-chip memory serving non-sequential read requests that occur during each iteration of the graph processing algorithm.

Example 4: The system of Example 3, wherein the on-chip memory comprises a block dynamic access memory (BRAM).

Example 5: The system of any one of Examples 3 to 4, wherein each graph core processes the one or more partitions by at least reading a partition specific interval of a vertex label array into the label scratch pad, reading vertex labels and pointers sequentially, reading a neighbors array of a current partition sequentially, placing a plurality of neighbor vertex identifiers in parallel through the crossbar to pass the plurality of neighbor vertex identifiers to a correct graph core, and retrieving, from the crossbar, a plurality of resulting neighbor vertex labels in an original order.

Example 6: The system of Example 5, wherein each graph core further processes the one or more partitions by at least combining a plurality of source vertices and destination vertices based at least on a left bound and a right bound of a source vertex and a neighbor index of a destination vertex.

Example 7: The system of Example 6, wherein each graph core further processes the one or more partitions by at least updating, based at least on a plurality of edges annotated with a source vertex label and a destination vertex label, a portion of the plurality of vertices comprising a partition.

Example 8: The system of any one of Examples 1 to 7, wherein each graph core of the plurality of graph cores is coupled with a single memory channel upon which the plurality of partitions are distributed to the plurality of graph cores.

Example 9: The system of any one of Examples 1 to 8, wherein the crossbar comprises a bank shuffle level configured to receive route, from one graph core to another graph core, a neighbors array comprising a sequence of numbers serving as addresses to vertex labels in a vertex labels array of a corresponding partition.

Example 10: The system of Example 9, the routing is performed based on a last $\log_2 e$ quantity of bits comprising the neighbors array, and wherein e corresponds to a quantity of banks comprising an on-chip memory of each graph core.

Example 11: The system of any one of Examples 9 to 10, wherein the crossbar further comprises a core shuffle level configured to shuffle neighbor indices annotated with originating line and lane to a graph core containing a corresponding vertex label.

Example 12: The system of Example 11, wherein the shuffling of the neighbor indices are performed based on a first $\log_2 p$ quantity of bits of the neighbor array, and wherein p corresponds to a quantity of the plurality of graph cores.

Example 13: The system of any one of Examples 1 to 12, wherein the plurality of graph cores are implemented on a field programmable gate array (FPGA).

Example 14: The system of any one of Examples 1 to 13, wherein the plurality of graph cores are synthesized on the field programming gate array (FPGA) based on one or more user defined functions (UDFs) including a map function to produce updates to a source vertex label of each edge in the graph and a reduce function to aggregate updates into a single value for each vertex of the graph that is being updated.

Example 15: The system of any one of Examples 1 to 14, wherein the graph processing algorithm comprises one or more of breadth-first search (BFS), page rank (PR), weakly connected components (WCC), subgraph, inverse graph, in-degree, out-degree, incoming edges, outgoing edges, neighbors, is-reachable, shortest path, shortest path one to all, k shortest paths, strongly connected components, depth first traversal, and single source shortest path (SSSP).

Example 16: A method, comprising: partitioning a graph into a plurality of partitions; distributing, to each graph core of a plurality of graph cores, one or more partitions of the plurality of partitions such that each graph core executes a graph processing algorithm on one or more partitions of the plurality of partitions, the executing of the graph processing algorithm including the plurality of graph cores exchanging one or more vertex labels via a crossbar interconnecting the plurality of graph cores; and determining, based at least on a plurality of partial results received from the plurality of graph cores, a result of the graph processing algorithm.

Example 17: The method of Example 16, wherein the partitioning of the graph includes partitioning, into a plurality of intervals, a plurality of vertices of the graph, wherein the partitioning of the graph further includes partitioning each interval of the plurality of intervals into a plurality of sub-intervals, wherein a size of each sub-interval of the plurality of sub-intervals corresponds to a size of a label scratch pad of each graph core, wherein the label scratch pad comprises an on-chip memory serving non-sequential read requests that occur during each iteration of the graph processing algorithm, wherein each graph core processes the one or more partitions by at least reading a partition specific interval of a vertex label array into the label scratch pad, reading vertex labels and pointers sequentially, reading a neighbors array of a current partition sequentially, placing a plurality of neighbor vertex identifiers in parallel through the crossbar to pass the plurality of neighbor vertex identifiers to a correct graph core, and retrieving, from the crossbar, a plurality of resulting neighbor vertex labels in an original order.

Example 18: The method of any one of Examples 16 to 17, wherein each graph core of the plurality of graph cores is coupled with a single memory channel upon which the plurality of partitions are distributed to the plurality of graph cores.

Example 19: The method of any one of Examples 16 to 18, wherein the crossbar comprises a bank shuffle level configured to receive route, from one graph core to another graph core, a neighbors array comprising a sequence of numbers serving as addresses to vertex labels in a vertex labels array of a corresponding partition, wherein the routing is performed based on a last $\log_2 e$ quantity of bits comprising the neighbors array, wherein e corresponds to a quantity of banks comprising an on-chip memory of each graph core, wherein the crossbar further comprises a core shuffle level configured to shuffle neighbor indices annotated with originating line and lane to a graph core containing a corresponding vertex label, wherein the shuffling of the neighbor indices are performed based on a first $\log_2 p$ quantity of bits of the neighbor array, and wherein p corresponds to a quantity of the plurality of graph cores.

Example 20: A non-transitory computer readable medium storing instructions, which when executed by at least one data processor, result in operations comprising: partitioning a graph into a plurality of partitions; distributing, to each graph core of a plurality of graph cores, one or more partitions of the plurality of partitions such that each graph core executes a graph processing algorithm on one or more partitions of the plurality of partitions, the executing of the graph processing algorithm including the plurality of graph cores exchanging one or more vertex labels via a crossbar interconnecting the plurality of graph cores; and determining, based at least on a plurality of partial results received from the plurality of graph cores, a result of the graph processing algorithm.

Figure 15:
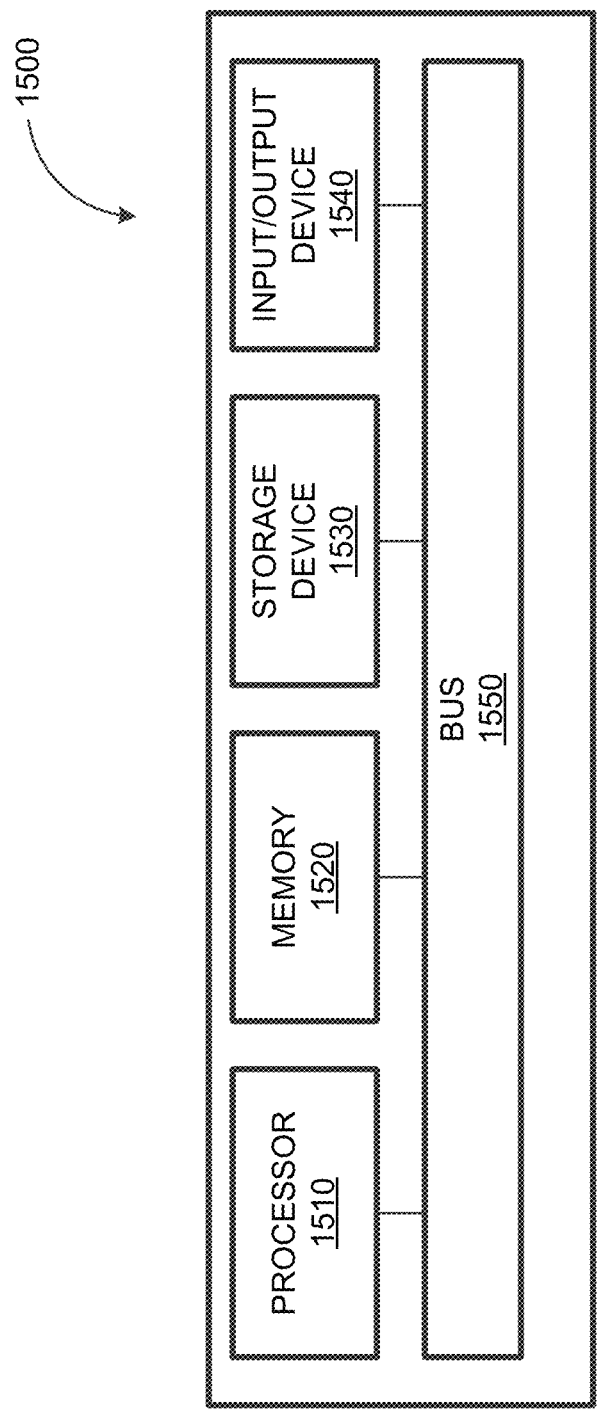
FIG. 15 depicts a block diagram illustrating an example of a computing system, in accordance with some example embodiments.

FIG. 15 depicts a block diagram illustrating an example of a computing system 1500 consistent with implementations of the current subject matter. Referring to FIGS. 1-15, the computing system 1500 may implement the graph processing engine 115 and/or any components therein.

As shown in FIG. 15, the computing system 1500 can include a processor 1510, a memory 1520, a storage device 1530, and input/output device 1540. The processor 1510, the memory 1520, the storage device 1530, and the input/output device 1540 can be interconnected via a system bus 550. The processor 1510 is capable of processing instructions for execution within the computing system 1500. Such executed instructions can implement one or more components of, for example, the graph processing engine 115. In some implementations of the current subject matter, the processor 1510 can be a single-threaded processor. Alternately, the processor 1510 can be a multi-threaded processor. The processor 1510 is capable of processing instructions stored in the memory 1520 and/or on the storage device 1530 to display graphical information for a user interface provided via the input/output device 1540.

The memory 1520 is a computer readable medium such as volatile or non-volatile that stores information within the computing system 1500. The memory 1520 can store data structures representing configuration object databases, for example. The storage device 1530 is capable of providing persistent storage for the computing system 1500. The storage device 1530 can be a floppy disk device, a hard disk device, an optical disk device, or a tape device, or other suitable persistent storage means. The input/output device 1540 provides input/output operations for the computing system 1500. In some implementations of the current subject matter, the input/output device 1540 includes a keyboard and/or pointing device. In various implementations, the input/output device 1540 includes a display unit for displaying graphical user interfaces.

According to some implementations of the current subject matter, the input/output device 1540 can provide input/output operations for a network device. For example, the input/output device 1540 can include Ethernet ports or other networking ports to communicate with one or more wired and/or wireless networks (e.g., a local area network (LAN), a wide area network (WAN), the Internet).

In some implementations of the current subject matter, the computing system 1500 can be used to execute various interactive computer software applications that can be used for organization, analysis and/or storage of data in various (e.g., tabular) format (e.g., Microsoft Excel®, and/or any other type of software). Alternatively, the computing system 1500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1540. The user interface can be generated and presented to a user by the computing system 1500 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   partitioning a graph into a plurality of partitions;
   distributing, to each graph core of a plurality of graph cores, one or more partitions of the plurality of partitions such that each graph core executes a graph processing algorithm on one or more partitions of the plurality of partitions, the executing of the graph processing algorithm including the plurality of graph cores exchanging one or more vertex labels via a crossbar interconnecting the plurality of graph cores; and
   determining, based at least on a plurality of results received from the plurality of graph cores, a result of the graph processing algorithm.

2. The system of claim 1, wherein the partitioning of the graph includes partitioning, into a plurality of intervals, a plurality of vertices of the graph, and wherein the partitioning of the graph further includes partitioning each interval of the plurality of intervals, a plurality of sub-intervals.

3. The system of claim 2, wherein a size of each sub-interval of the plurality of sub-intervals corresponds to a size of a label scratch pad of each graph core, and wherein the label scratch pad comprises an on-chip memory serving non-sequential read requests that occur during each iteration of the graph processing algorithm.

4. The system of claim 3, wherein the on-chip memory comprises a block dynamic access memory (BRAM).

5. The system of claim 3, wherein each graph core processes the one or more partitions by at least reading a partition specific interval of a vertex label array into the label scratch pad, reading vertex labels and pointers sequentially, reading a neighbors array of a current partition sequentially, placing a plurality of neighbor vertex identifiers in parallel through the crossbar to pass the plurality of neighbor vertex identifiers to a correct graph core, and retrieving, from the crossbar, a plurality of resulting neighbor vertex labels in an original order.

6. The system of claim 5, wherein each graph core further processes the one or more partitions by at least combining a plurality of source vertices and destination vertices based at least on a left bound and a right bound of a source vertex and a neighbor index of a destination vertex.

7. The system of claim 6, wherein each graph core further processes the one or more partitions by at least updating, based at least on a plurality of edges annotated with a source vertex label and a destination vertex label, a portion of the plurality of vertices comprising a partition.

8. The system of claim 1, wherein each graph core of the plurality of graph cores is coupled with a single memory channel upon which the plurality of partitions are distributed to the plurality of graph cores.

9. The system of claim 1, wherein the crossbar comprises a bank shuffle level configured to receive route, from one graph core to another graph core, a neighbors array comprising a sequence of numbers serving as addresses to vertex labels in a vertex labels array of a corresponding partition.

10. The system of claim 9, wherein the routing is performed based on a last $\log_2 e$ quantity of bits comprising the neighbors array, and wherein e corresponds to a quantity of banks comprising an on-chip memory of each graph core.

11. The system of claim 9, wherein the crossbar further comprises a core shuffle level configured to shuffle neighbor indices annotated with originating line and lane to a graph core containing a corresponding vertex label.

12. The system of claim 11, wherein the shuffling of the neighbor indices are performed based on a first $\log_2 p$ quantity of bits of the neighbor array, and wherein p corresponds to a quantity of the plurality of graph cores.

13. The system of claim 1, wherein the plurality of graph cores are implemented on a field programmable gate array (FPGA).

14. The system of claim 1, wherein the plurality of graph cores are synthesized on a field programming gate array (FPGA) based on one or more user defined functions (UDFs) including a map function to produce updates to a source vertex label of each edge in the graph and a reduce function to aggregate updates into a single value for each vertex of the graph that is being updated.

15. The system of claim 1, wherein the graph processing algorithm comprises one or more of breadth-first search (BFS), page rank (PR), weakly connected components (WCC), subgraph, inverse graph, in-degree, out-degree, incoming edges, outgoing edges, neighbors, is-reachable, shortest path, shortest path one to all, k shortest paths, strongly connected components, depth first traversal, and single source shortest path (SSSP).

16. A computer-implemented method, comprising:
   partitioning a graph into a plurality of partitions;
   distributing, to each graph core of a plurality of graph cores, one or more partitions of the plurality of partitions such that each graph core executes a graph processing algorithm on one or more partitions of the plurality of partitions, the executing of the graph processing algorithm including the plurality of graph cores exchanging one or more vertex labels via a crossbar interconnecting the plurality of graph cores; and
   determining, based at least on a plurality of results received from the plurality of graph cores, a result of the graph processing algorithm.

17. The method of claim 16, wherein the partitioning of the graph includes partitioning, into a plurality of intervals, a plurality of vertices of the graph, wherein the partitioning of the graph further includes partitioning each interval of the plurality of intervals into a plurality of sub-intervals, wherein a size of each sub-interval of the plurality of sub-intervals corresponds to a size of a label scratch pad of each graph core, wherein the label scratch pad comprises an on-chip memory serving non-sequential read requests that occur during each iteration of the graph processing algorithm, wherein each graph core processes the one or more partitions by at least reading a partition specific interval of a vertex label array into the label scratch pad, reading vertex labels and pointers sequentially, reading a neighbors array of a current partition sequentially, placing a plurality of neighbor vertex identifiers in parallel through the crossbar to pass the plurality of neighbor vertex identifiers to a correct graph core, and retrieving, from the crossbar, a plurality of resulting neighbor vertex labels in an original order.

18. The method of claim 16, wherein each graph core of the plurality of graph cores is coupled with a single memory channel upon which the plurality of partitions are distributed to the plurality of graph cores.

19. The method of claim 16, wherein the crossbar comprises a bank shuffle level configured to receive route, from one graph core to another graph core, a neighbors array comprising a sequence of numbers serving as addresses to vertex labels in a vertex labels array of a corresponding partition, wherein the routing is performed based on a last $\log_2 e$ quantity of bits comprising the neighbors array, wherein e corresponds to a quantity of banks comprising an on-chip memory of each graph core, wherein the crossbar further comprises a core shuffle level configured to shuffle neighbor indices annotated with originating line and lane to a graph core containing a corresponding vertex label, wherein the shuffling of the neighbor indices are performed based on a first $\log_2 p$ quantity of bits of the neighbor array, and wherein p corresponds to a quantity of the plurality of graph cores.

20. A non-transitory computer readable medium storing instructions, which when executed by at least one data processor, result in operations comprising:
    partitioning a graph into a plurality of partitions;
    distributing, to each graph core of a plurality of graph cores, one or more partitions of the plurality of partitions such that each graph core executes a graph processing algorithm on one or more partitions of the plurality of partitions, the executing of the graph processing algorithm including the plurality of graph cores exchanging one or more vertex labels via a crossbar interconnecting the plurality of graph cores; and
    determining, based at least on a plurality of results received from the plurality of graph cores, a result of the graph processing algorithm.

* * * * *